(12) United States Patent
Gideon, III

(10) Patent No.: US 10,516,983 B2
(45) Date of Patent: Dec. 24, 2019

(54) SYSTEMS, DEVICES, AND METHODS FOR EMERGENCY RESPONSES AND SAFETY

(71) Applicant: Intrinsic Value, LLC, Nashville, TN (US)

(72) Inventor: Clarence J. Gideon, III, Nashville, TN (US)

(73) Assignee: Intrinsic Value, LLC, Nashville, TN (US)

( * ) Notice: Subject to any disclaimer, the term of this patent is extended or adjusted under 35 U.S.C. 154(b) by 0 days.

(21) Appl. No.: 16/172,220

(22) Filed: Oct. 26, 2018

(65) Prior Publication Data

US 2019/0110183 A1    Apr. 11, 2019

Related U.S. Application Data

(62) Division of application No. 15/688,814, filed on Aug. 28, 2017.
(Continued)

(51) Int. Cl.
*H04W 4/90* (2018.01)
*H04W 76/50* (2018.01)
(Continued)

(52) U.S. Cl.
CPC .............. *H04W 4/90* (2018.02); *G01S 19/48* (2013.01); *G01S 19/49* (2013.01); *H04L 67/14* (2013.01); *H04M 1/72536* (2013.01); *H04M 1/72583* (2013.01); *H04M 3/5116* (2013.01); *H04W 4/027* (2013.01); *H04W 76/50* (2018.02); *H04L 67/02* (2013.01); *H04M 2242/14* (2013.01)

(58) Field of Classification Search
CPC ... A61B 5/1118; A61B 5/1116; A61B 5/1122; A61B 5/681; A61B 2560/0242; A61B 5/7246; A61B 5/7282; A61B 2503/10; A61B 5/0002; A61B 5/1115; A61B 5/1114; H04L 12/2803; H04M 1/72536; H04M 1/72569; H04M 1/72583
See application file for complete search history.

(56) References Cited

U.S. PATENT DOCUMENTS 5,937,355 A    8/1999    Joong et al.
6,115,598 A    9/2000    Yu
(Continued)

FOREIGN PATENT DOCUMENTS

KR    10-2015-0093914    8/2015

OTHER PUBLICATIONS

"RapidSOS | Transformative Technology to Save Lives." Meet Our Team | RapidSOS, rapidsos.com/.
(Continued)

*Primary Examiner* — Kwasi Karikari
(74) *Attorney, Agent, or Firm* — Jason P. Mueller; Adams and Reese, LLP

(57) ABSTRACT

Systems, devices, and methods for emergency responses are provided. A client device can be provided with a response to an emergency via a networked system that can determine that the client device is located with a defined area of coverage, and can route a call session to a answering platform associated with answering station device that can facilitate a facilitate a safety service. Client devices located outside the coverage area can be directed to communicate via a call to 911.

22 Claims, 17 Drawing Sheets

Related U.S. Application Data

(60) Provisional application No. 62/380,064, filed on Aug. 26, 2016.

(51) Int. Cl.
| | |
|---|---|
| *G01S 19/48* | (2010.01) |
| *H04L 29/08* | (2006.01) |
| *H04M 1/725* | (2006.01) |
| *H04M 3/51* | (2006.01) |
| *H04W 4/02* | (2018.01) |
| *G01S 19/49* | (2010.01) |

(56) References Cited

U.S. PATENT DOCUMENTS

| | | |
|---|---|---|
| 6,172,644 B1 | 1/2001 | Stilp |
| 6,233,445 B1 | 5/2001 | Boltz et al. |
| 6,236,365 B1 | 5/2001 | LeBlanc et al. |
| 6,256,489 B1 | 7/2001 | Litcher et al. |
| 6,285,321 B1 | 9/2001 | Stilp et al. |
| 6,525,768 B2 | 2/2003 | Obradovich |
| 6,721,305 B1 | 4/2004 | Chan et al. |
| 6,741,863 B1 | 5/2004 | Chiang et al. |
| 6,952,181 B2 | 10/2005 | Karr et al. |
| 7,026,928 B1 | 4/2006 | Lane |
| 7,092,695 B1 | 8/2006 | Boling et al. |
| 7,098,787 B2 | 8/2006 | Miller |
| 7,149,533 B2 | 12/2006 | Laird et al. |
| 7,353,034 B2 | 4/2008 | Haney |
| 7,366,157 B1 | 4/2008 | Valentine et al. |
| 7,581,434 B1 | 9/2009 | Discenzo et al. |
| 7,933,581 B2 | 4/2011 | Wijayanathan et al. |
| 8,005,456 B2 | 8/2011 | Buehler et al. |
| 8,195,121 B2 | 6/2012 | Dunn et al. |
| 8,472,917 B1 | 6/2013 | Rahman et al. |
| 8,483,651 B1 | 7/2013 | Zamora et al. |
| 8,509,392 B2 | 8/2013 | Athias |
| 8,521,121 B2 | 8/2013 | Ray et al. |
| 8,538,468 B2 | 9/2013 | Daly |
| 8,594,105 B1 | 11/2013 | Breau et al. |
| 8,624,727 B2 | 1/2014 | Saigh et al. |
| 8,699,672 B1 | 4/2014 | Schumacher |
| 8,718,592 B2 | 5/2014 | Annamalai |
| 8,755,767 B2 | 6/2014 | Maier et al. |
| 8,787,944 B2 | 7/2014 | Smith |
| 8,818,354 B1 | 8/2014 | Bennett |
| 8,886,153 B2 | 11/2014 | Velusamy et al. |
| 8,913,981 B1 | 12/2014 | Schumaher |
| 8,913,983 B2 | 12/2014 | Lorello |
| 8,994,591 B2 | 3/2015 | Dupray et al. |
| 9,002,384 B1 | 4/2015 | Hallenbeck |
| 9,014,661 B2 | 4/2015 | deCharms |
| 9,112,996 B2 | 8/2015 | Klaban |
| 9,173,065 B2 | 10/2015 | Smith et al. |
| 9,300,784 B2 | 3/2016 | Roberts et al. |
| 9,313,637 B2 | 4/2016 | Mitchell, Jr. et al. |
| 9,538,499 B2 | 1/2017 | Smith et al. |
| 9,572,002 B2 | 2/2017 | South |
| 9,615,234 B2 | 4/2017 | Kowalewski et al. |
| 9,629,185 B1 | 4/2017 | Gluckman et al. |
| 9,681,282 B2 | 6/2017 | Gellens et al. |
| 9,788,181 B2 | 10/2017 | Edge et al. |
| 9,918,211 B2 | 3/2018 | Meredith et al. |
| 10,028,090 B2 | 7/2018 | Zellner |
| 10,044,852 B2 | 8/2018 | Bonner |
| 10,044,857 B2 | 8/2018 | Philbin |
| 10,045,153 B2 | 8/2018 | Smith et al. |
| 10,045,188 B2 | 8/2018 | Diamond |
| 10,045,249 B2 | 8/2018 | Lee et al. |
| 10,051,451 B1 | 8/2018 | Ray et al. |
| 10,051,684 B2 | 8/2018 | Edge |
| 10,070,466 B2 | 9/2018 | Livingood |
| 10,080,098 B1 | 9/2018 | Edge |
| 10,080,149 B2 | 9/2018 | Anderson et al. |
| 10,085,115 B2 | 9/2018 | Mayor et al. |
| 10,085,142 B2 | 9/2018 | Edge et al. |
| 10,097,979 B2 | 10/2018 | Edge et al. |
| 10,097,980 B2 | 10/2018 | South |
| 10,110,463 B2 | 10/2018 | Reis |
| 10,111,077 B1 | 10/2018 | Bitra et al. |
| 10,182,332 B2 | 1/2019 | Saito et al. |
| 10,225,402 B2 | 3/2019 | Sterman et al. |
| 10,225,766 B2 | 3/2019 | Elia et al. |
| 10,237,688 B2 | 3/2019 | Smith |
| 10,250,505 B2 | 4/2019 | Dahan et al. |
| 10,285,016 B2 | 5/2019 | Jiang et al. |
| 10,306,449 B2 | 5/2019 | Gideon, III |
| 10,327,105 B1 | 6/2019 | White et al. |
| 10,334,111 B2 | 6/2019 | Vagelos |
| 10,356,240 B2 | 7/2019 | Self et al. |
| 10,447,865 B2 | 7/2019 | Mehta et al. |
| 10,375,512 B2 | 8/2019 | Marko |
| 10,375,558 B2 | 8/2019 | Katz et al. |
| 10,390,203 B2 | 8/2019 | Romano |
| 10,436,876 B2 | 10/2019 | Meredith et al. |
| 10,440,545 B2 | 10/2019 | Horton et al. |
| 2002/0065063 A1 | 5/2002 | Uhlik et al. |
| 2002/0193091 A1 | 12/2002 | Zmarthie |
| 2004/0241045 A1 | 12/2004 | Sohl, III et al. |
| 2005/0030224 A1 | 2/2005 | Koch |
| 2006/0169033 A1 | 8/2006 | Discenzo |
| 2007/0078610 A1 | 3/2007 | Adams et al. |
| 2007/0155399 A1 | 7/2007 | Alberth, Jr. et al. |
| 2008/0227429 A1 | 9/2008 | Hodgson et al. |
| 2009/0176474 A1 | 7/2009 | Bajko |
| 2009/0315719 A1* | 12/2009 | Song ............... G08B 21/0446 340/573.1 |
| 2010/0142442 A1 | 6/2010 | Pandey et al. |
| 2010/0261448 A1 | 10/2010 | Peters |
| 2010/0286567 A1* | 11/2010 | Wolfe ................ A61B 5/1117 600/587 |
| 2011/0074547 A1 | 3/2011 | Seshadri |
| 2011/0142207 A1 | 6/2011 | Goldman et al. |
| 2011/0195687 A1 | 8/2011 | Das et al. |
| 2012/0086570 A1 | 4/2012 | Gancarcik et al. |
| 2012/0100824 A1 | 4/2012 | Michael |
| 2013/0052982 A1 | 2/2013 | Rohde et al. |
| 2013/0171958 A1 | 7/2013 | Goodson et al. |
| 2013/0344842 A1 | 12/2013 | McDonald et al. |
| 2014/0188404 A1 | 7/2014 | Von Herzen et al. |
| 2014/0191863 A1* | 7/2014 | Ten Kate ............. A61B 5/1116 340/539.12 |
| 2014/0194085 A1 | 7/2014 | Marshall |
| 2014/0212986 A1 | 7/2014 | Angelescu et al. |
| 2015/0269835 A1 | 9/2015 | Benoit et al. |
| 2015/0356860 A1 | 12/2015 | Robichaud et al. |
| 2016/0012702 A1 | 1/2016 | Hart et al. |
| 2016/0042637 A1 | 2/2016 | Cahill |
| 2016/0261997 A1 | 9/2016 | Gladstone |
| 2017/0353892 A1 | 12/2017 | Elia et al. |
| 2018/0007807 A1 | 1/2018 | Welch, Jr. |
| 2018/0077553 A1 | 3/2018 | Gideon, III |
| 2018/0084587 A1 | 3/2018 | Noor |
| 2018/0124584 A1 | 5/2018 | Venkatraman et al. |
| 2018/0144615 A1 | 5/2018 | Kinney et al. |
| 2018/0199160 A1 | 7/2018 | Edge |
| 2018/0199177 A1 | 7/2018 | Saito et al. |
| 2018/0199179 A1 | 7/2018 | Rauner |
| 2018/0199180 A1 | 7/2018 | Edge et al. |
| 2018/0206062 A1 | 7/2018 | Jain et al. |
| 2018/0206100 A1 | 7/2018 | Eisner et al. |
| 2018/0213350 A1 | 7/2018 | Pon et al. |
| 2018/0225957 A1 | 8/2018 | Coyne et al. |
| 2018/0227419 A1 | 8/2018 | Stojanovski et al. |
| 2018/0249283 A1 | 8/2018 | Jiang et al. |
| 2018/0249315 A1 | 8/2018 | Mehta et al. |
| 2018/0261078 A1 | 9/2018 | Meredith et al. |
| 2018/0262544 A1 | 9/2018 | Mehta et al. |
| 2018/0268681 A1 | 9/2018 | Schinkel et al. |
| 2018/0278747 A1 | 9/2018 | Chiang et al. |
| 2018/0295183 A1 | 10/2018 | Terpstra et al. |
| 2018/0301017 A1 | 10/2018 | Dizengof et al. |
| 2018/0302450 A1 | 10/2018 | Nimbavikar et al. |
| 2018/0310159 A1 | 10/2018 | Katz et al. |

(56) References Cited

U.S. PATENT DOCUMENTS

| | | |
|---|---|---|
| 2018/0324294 A1 | 11/2018 | Yoakum et al. |
| 2018/0324552 A1 | 11/2018 | Kumar et al. |
| 2018/0327091 A1 | 11/2018 | Burks et al. |
| 2018/0348759 A1 | 12/2018 | Freeman et al. |
| 2018/0352081 A1 | 12/2018 | Self et al. |
| 2018/0352085 A1 | 12/2018 | Philbin |
| 2018/0367943 A1 | 12/2018 | Pipes |
| 2018/0375991 A1 | 12/2018 | Bot et al. |
| 2018/0376313 A1 | 12/2018 | Horton et al. |
| 2019/0007922 A9 | 1/2019 | Edge et al. |
| 2019/0014462 A1 | 1/2019 | Edge et al. |
| 2019/0014613 A1 | 1/2019 | Antsev et al. |
| 2019/0020992 A1 | 1/2019 | Romano |
| 2019/0098603 A1 | 3/2019 | Lei et al. |
| 2019/0104395 A1 | 4/2019 | Mehta et al. |
| 2019/0253861 A1 | 8/2019 | Horelik et al. |

OTHER PUBLICATIONS

Aratani, Lori, "Teens' App Wins District Contest", The Washington Post, Feb. 10, 2018.

\* cited by examiner

SYSTEMS, DEVICES, AND METHODS FOR EMERGENCY RESPONSES AND SAFETY

CROSS-REFERENCE TO RELATED APPLICATION

The present application is a divisional of U.S. Ser. No. 15/688,814 filed Aug. 28, 2017 which claims the benefit of U.S. Provisional Patent Application No. 62/380,064, filed Aug. 26, 2016, the contents of each of which are incorporated herein by reference in their entirety.

BRIEF DESCRIPTION OF THE DRAWINGS

The accompanying drawings form part of the disclosure and are incorporated into the subject specification. The drawings illustrate example embodiments of the disclosure and, in conjunction with the present description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like, but not necessarily the same or identical, elements throughout.

DETAILED DESCRIPTION

The disclosure provides, in least some embodiments, systems, devices, methods and/or computer-readable non-transitory storage media for emergency responses are provided. A client device can be provided with a response to an emergency via a networked system that can determine that the client device is located with a defined area of coverage, and can route a call session to a answering platform associated with answering station device that can facilitate a facilitate a safety service. Client devices located outside the coverage area can be directed to communicate via a call to 911. While various embodiments are illustrated in connection with client devices that embody or constitute mobile devices, the disclosure is not so limited and other types of clients are contemplated.

Figure 1:
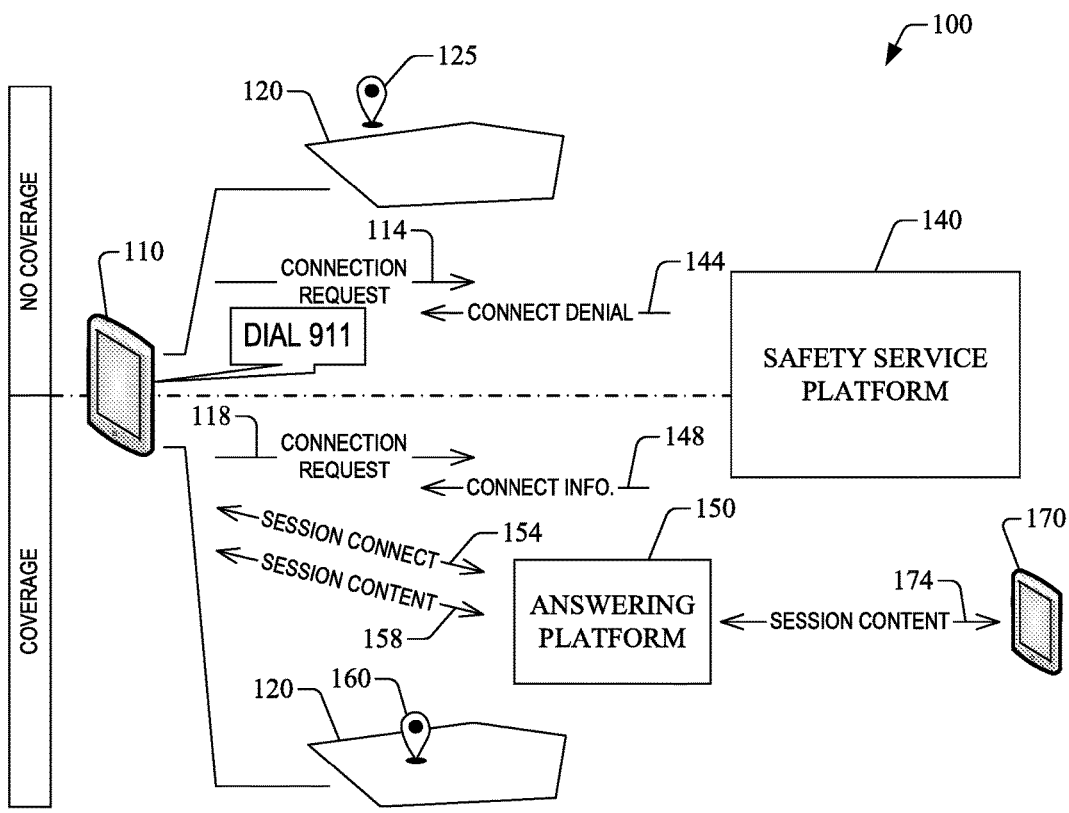
FIG. 1 presents an example of an operational environment for emergency responses in accordance with one or more embodiments of the disclosure.

FIG. 1 illustrates an example of an environment 100 for emergency responses in accordance with one or more embodiments of the disclosure. The environment 100 includes a device 110 that can be configured to operate in accordance with aspects of this disclosure. To that end, computer-accessible instructions (e.g., computer-readable and/or computer-executable instructions) can be retained in one or more memory devices of the mobile device 110. In response to execution, the computer-accessible instructions can cause the mobile device 110 to operate in accordance with aspects of this disclosure. In some scenarios, can send a connection request 114 to establish a connection with a destination device that can provide or otherwise facilitate a safety service. The mobile device 110 can send the connection request 114 to a group of safety platform devices 140 (collectively referred to as safety service platform 140). The safety service can have a defined coverage area 120. For instance, the coverage area 120 can correspond to an area associated with a PSAP center within a defined region (e.g., a county). In one scenario, the mobile device 110 can send the connection request 114 from a location 125 outside the defined coverage area 120. In such a scenario, a server device within the safety service platform 140 can determine that the location 125 is outside the service coverage area 120. To that end, the connection request 114 can include information indicative of the location 125 of the mobile device 110. In response to such a determination, the server device can determine that service coverage is unavailable to the mobile device 110, and can send a connect denial message 114. The connect denial message 144 can be received by the mobile device 110 and can cause the mobile device 110 to direct an end-user of the mobile device 110 to dial 911, for example. More specifically, in one embodiment, in response to receiving the connect denial message 144, the mobile device 110 can display a message to dial 911. For instance, a display device of the mobile device 110 can present one or more visual elements indicating to dial 911. In addition or in another embodiment, the mobile device can render an audible signal indicating to dial 911.

In other scenarios, the mobile device 110 can be located at a location 160 within the service coverage area 120 and can send a connection request 118 to establish a connection with a destination device that can provide or that can facilitate providing the safety service. The connection request 118 can include information indicative of the location 160, and can be sent to the safety service platform 140. A server device within the safety service platform 140 can receive the connection request 118 and can determine, using the location information, that the mobile device 110 is located within the service coverage area 120. In response, the server device can send a connect information message 148 to the mobile device 110. The connection information message 148 can include an Internet protocol (IP) address or another type of communication address of a remote server device within a group of answering platform device (collectively referred to as answering platform 150). In some embodiments, the remote server device (not depicted) can establish a first connection with the mobile device 110. Such a connection is represented with session connect 154. In addition, in some instances, the remote server device can determine that the destination device is available for communication, and can establish a second connection with the destination device. The destination device can be included, for example, within the answering platform 150. The first connection and the second connection can result in the requested connection, where the mobile device 110 is connected with the intended destination device.

Upon or after the requested connection is established, the mobile device 110 and the destination device can exchange session content 158. The session content 158 can include text messages (e.g., SMS messages and/or MMS messages), audio signals, and/or video signals.

In some embodiments, the destination device that communicates with the mobile telephone 110 can send (e.g., forward) are least a portion of the session content 158 to a third-party device. As such, as is illustrated in FIG. 1, such a destination device can send session content 174 to a mobile telephone 170. In addition, the mobile telephone 170 can send information (e.g., audio signals, video signals, and/or messages) to the mobile device 110 via the answering platform 150.

Figure 2:
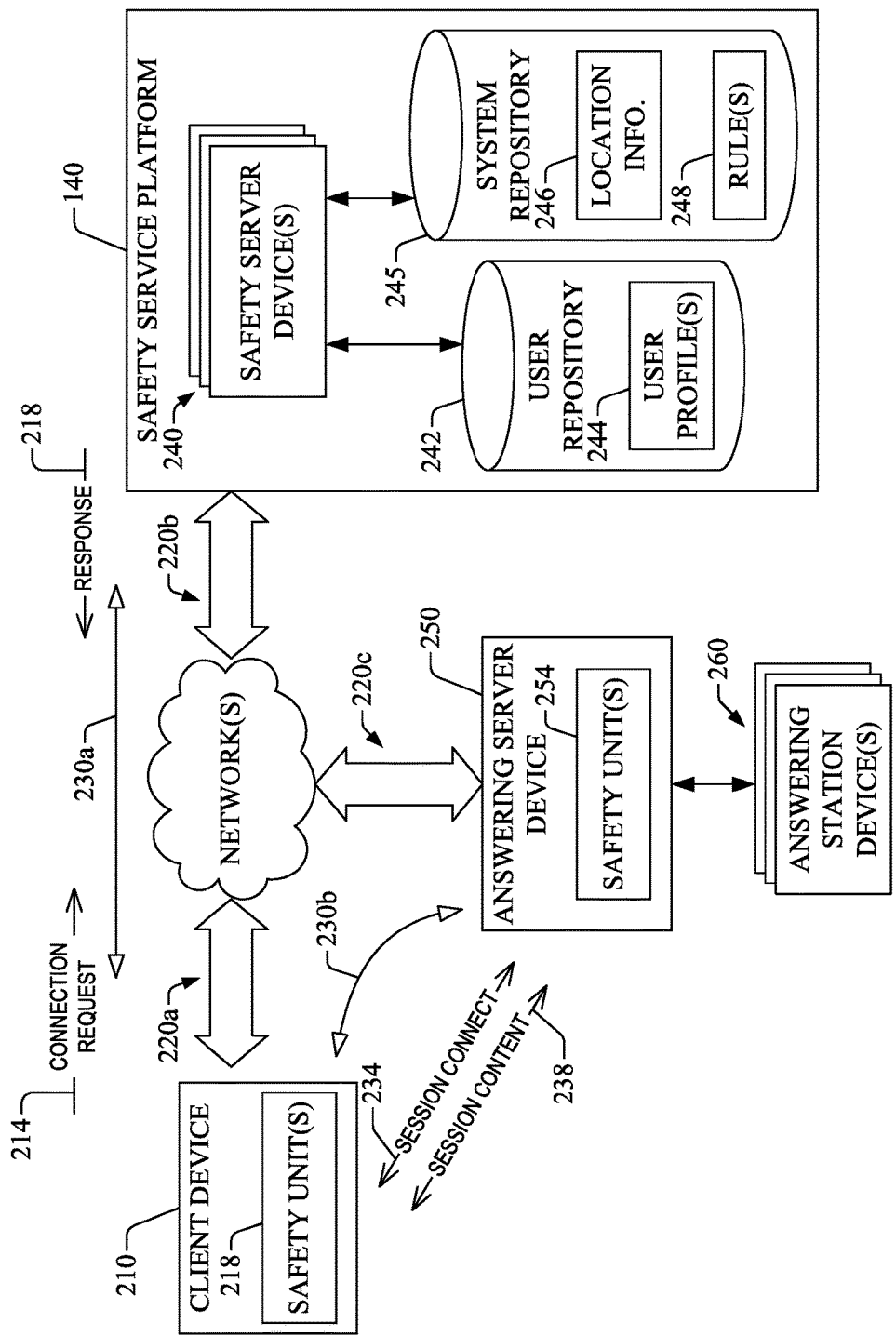
FIG. 2 presents another example of an operational environment for emergency responses in accordance with one or more embodiments of the disclosure.

FIG. 2 illustrates another example of an operational environment for emergency responses in accordance with one or more embodiments of the disclosure. The environment 100 includes a client device 210 that can be configured to operate in accordance with aspects of this disclosure. In some embodiments, the client device 210 can embody or can constitute the mobile device 110. Similar to the mobile device 110, the client device 210 can include one or more safety units 218 (collectively referred to as safety unit(s) 218). In some scenarios, the client device 210 can send a connection request 214 to establish a connection with a destination device that can provide or otherwise facilitate a safety service. The client device 210 can be mobile and, thus, can configure (e.g., generate and/or format) the connection request 214 to include information indicative of a location of the client device 210. The client device 110 can utilize or otherwise leverage one or more networks 225 to send the connection request 214 to the safety service platform 140. One or more links 220a (wireless links and/or wireline links) can functionally couple the client device 210 to at least one of the network(s) 225, and one or more links 220b (wireless links and/or wireline links) can functionality couple at least a second one of the network(s) 225 to the safety platform 140. More specifically, in some embodiments, the at least second one of the network(s) 225 can functionally couple the networks 225 to the one or more safety server devices 240. In some embodiments, the safety server device(s) 240 can embody or can constitute a group of host server devices that can implement a cloud solution for the safety service platform of this disclosure.

As mentioned, the safety service associated with the destination device that the client device 210 intends to connect can have a defined coverage area. As such, in some aspects, a server device of the safety server device(s) 240 can utilize or otherwise leverage location information (e.g., GPS coordinates) included in the connection request 214 in order to determine a coverage state of the client device 210. Specifically, the safety service platform 140 can include location information retained in one or more memory elements 246 (collectively referred to as location information 246) within one or more memory devices 245 (collectively referred to as system repository 245). The location information 245 can include a list (or another type of data structure) that includes a group of remote server devices and respective service coverage areas. In addition, the server device can compare a location of the client device 210 to the respective coverage areas. Based at least on such a comparison, the server device can determine the coverage state of the client device 210. In one scenario, the service device can determine that the location of the client device 210 is outside of the coverage areas recorded or otherwise registered in the system repository 245. Therefore, the server device can determine that the coverage state corresponds to an uncovered state, and can send a response 218 to the client device 210. In such a scenario, the response 218 can include a message indicative of denial of the connection request 214.

In another scenario, the server device that assesses the connection request 214 at the safety service platform 140 can identify a coverage area that contains the location of the client device 210. The coverage area is associated with an answering device server 250 that can be located remotely from the client device 210. In one aspect, the answering device server 250 can be located at a site that can include multiple destination devices that provide or otherwise facilitate an emergency response service. Therefore, the server device can determine that the coverage state correspond to a covered state, and can configure the response 218 to include information indicative of a communication address (e.g., an IP address) of the answering server device. The server device can send such a response 218 to the client device 210.

Regardless of the type of response 218, the client device 210 can receive the response 218 via a network pathway 230a. Receiving such a response 218 can cause the client device 210 to perform a defined action. In an example scenario in which the response 218 includes a connect denial message, the response 218 can cause the client device 210 to instruct the dialing of 911. More specifically, in one embodiment, in response to receiving the connect denial message 144, the mobile device 110 can display a message to dial 911. For instance, a display device of the mobile device 110 can present one or more visual elements indicating to dial 911. In addition or in another embodiment, the mobile device can render an audible signal indicating to dial 911.

In another example scenario in which the response 218 includes the communication address of the answering server device 250, receiving such a response 218 can cause the client device 210 to initiate a connection with the answering server device 250. The client device 210 and the answering server device 250 can exchange messages to establish a first connection. The messages are represented with session connect 234 and can be exchanged via a network pathway 230b that includes at least portion of the link(s) 220a, at least one of the network(s) 225, and at least a portion of the link(s)

220c. In addition, in some instances, the answering server device 250 can be functionally coupled to one or more answering station devices 260, and can determine that a first answering station device of the answering station device(s) 260 is available for communication. Thus, in some embodiments, the answering server device 250 can establish a second connection between the client device 210 and a streaming server device. The streaming server device can be embodied in or can include, for example, at least one of the safety unit(s) 254. In addition, the answering server device 250 can establish a third connection between the streaming server device and the first answering station device. The second connection and the third connection can result in the connection requested by the connection request 214, where the client device 210 is connected with the first answering station device.

Upon or after the connection requested by the connection request is established, the client device 110 and the first answering station device can exchange session content 238. The session content 238 can include text messages (e.g., SMS messages and/or MMS messages), audio signals, and/or video signals.

In some embodiments, a third-party device (e.g., a device from a government authority, police, or military; not depicted) can access the answering server device 250 to establish a connection with or otherwise login to the answering server device 250. Therefore, in some embodiments, the third-party device can send information pertaining to the area of coverage associated with the answering server device 250; e.g., the coverage area associated with a PSAP center. The safety unit(s) 254 can permit establishing a connection between the answering server device 250 and the third-party device.

Figure 3:
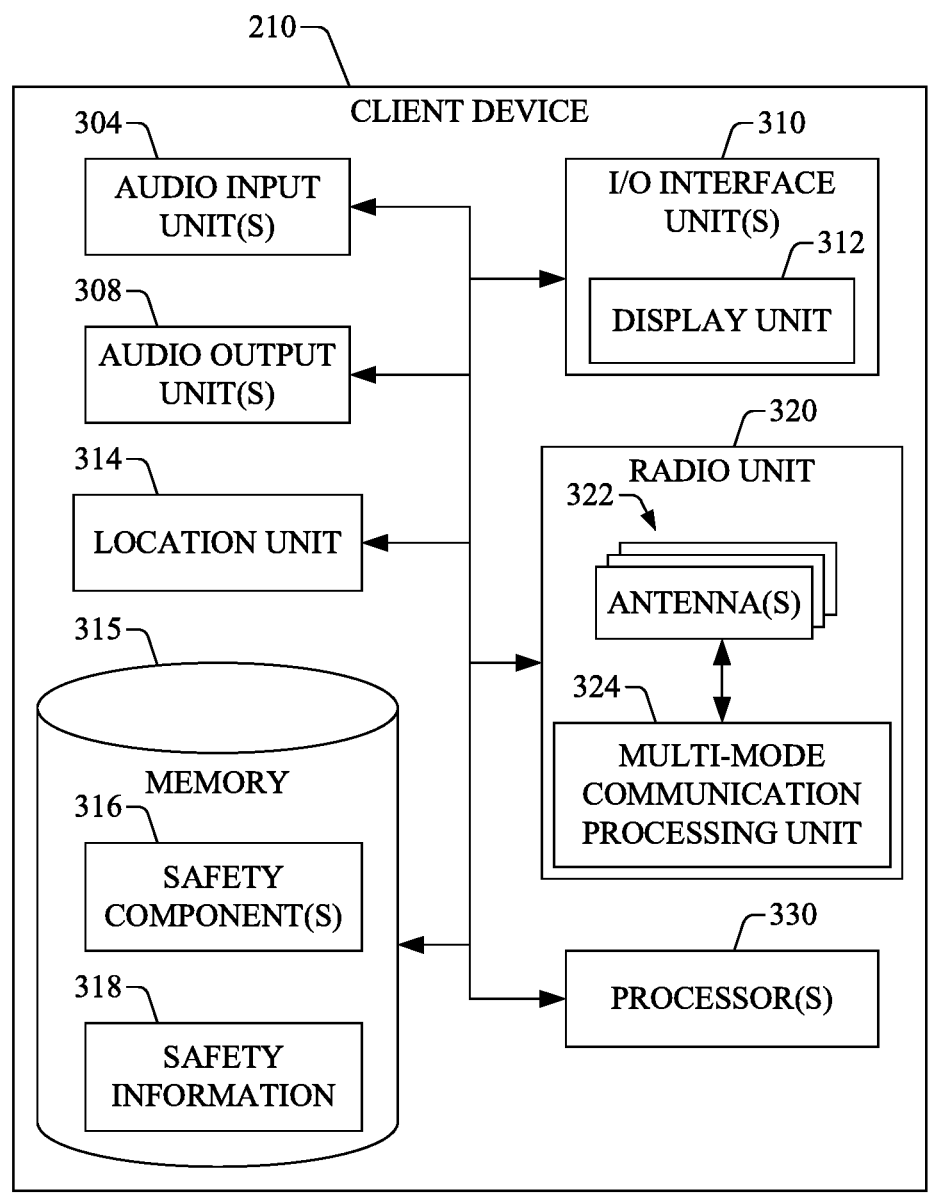
FIG. 3 presents an example of a client device for emergency responses in accordance with one or more embodiments of the disclosure.

FIG. 3 presents a block diagram 300 of an example of a client device 210 in accordance with one or more embodiments of the disclosure. As is illustrated, the client device 210 can include one or more audio input units 304 and one or more audio output units 308. As an illustration, the audio output unit(s) 308 can include speaker(s); digital-to-analog converters; volume control(s) and/or other audio controls, such as bass control, treble control, and the like; an on/off switch; a combination thereof; or the like. In addition or in another example, the audio input unit(s) 304 can include microphone(s), analog-to-digital converter(s), amplifier(s), filter(s), and/or other circuitry for processing of audio (e.g., equalizer(s)). The client device 210 also can include one or more input/output (I/O) interface units 310. In one aspect, the I/O interface unit(s) 310 can include a display unit 312. The display unit 312 can include, in some embodiments, a display device and operation circuitry for the operation of the display device. In one example, the display device can include a touch screen and, thus, the display unit 312 can include detection circuitry (not depicted) for the detection of physical interaction with the device, such as the application of a force (or pressure) on a surface of the touch screen.

The client device 210 also can include a location unit 314 that can generate location information, such as global positioning system (GPS) coordinates of the client device 210. To that end, the location unit 314 can be functionally coupled to a radio unit 320 that can receive timing messages from one or more satellites via respective deep-space links. The radio unit 320 can send the timing messages to the location unit 314. The location unit 314 can determine an estimate of a location of the client device 210 using at least the timing messages. It is noted that the disclosure is not limited to GPS coordinates and, in some embodiments, the location unit 314 can rely on other type of determinations in order to estimate a location of the client device. For instance, the location unit 314 can utilized or otherwise leverage triangulation of Wi-Fi signals (e.g., pilot signals) and/or cellular signals to determine an estimate of a location of the client device 210. Accordingly, as is illustrated in FIG. 3, the radio unit 320 can include one or more antennas 322 and a multi-mode communication processing unit 324 that can process multiple types of wireless signals received by at least one of the antenna(s) 322.

As is further illustrated in FIG. 3, the client device 210 also can include one or more memory devices 315 (collectively referred to as memory 315). The memory 315 can include one or more safety components 316 and safety information 318. In some embodiments, the safety component(s) 316 can be embodied in or can constitute computer-accessible instructions (e.g., computer-readable and/or computer-executable instructions) that, in response to execution, the computer-accessible instructions can cause the client device 210 to operate in accordance with aspects of this disclosure. In some embodiments, one or more processors 330 included in the client device 210 can execute the safety component(s) 316. The safety information 318 can be utilized during the operation of the client device 210 and can include, for example, location information generated by the location unit 314.

Figure 4:
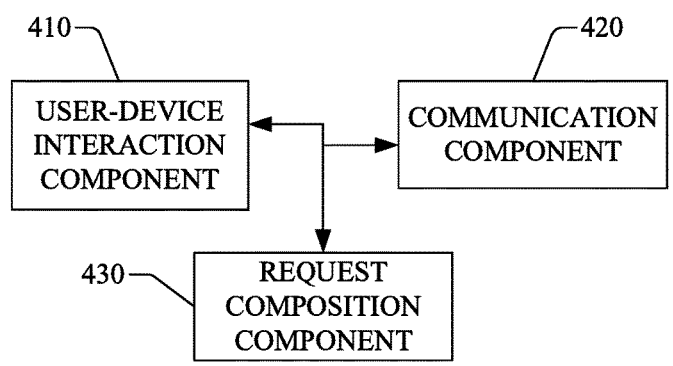
FIG. 4 presents an example of safety components for emergency responses in accordance with one or more embodiments of the disclosure.
Figure 5:
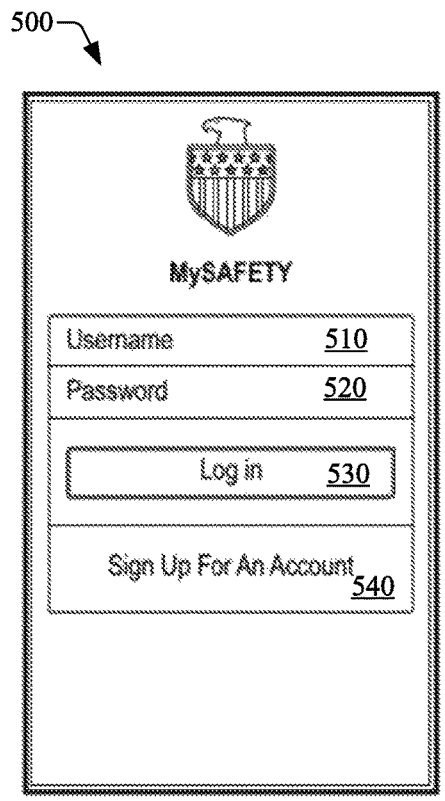
FIG. 5 presents an example of user interface for emergency responses in accordance with one or more embodiments of the disclosure.

In some embodiments, as is illustrated in FIG. 4, the safety component(s) 316 can include a user-device interaction component 410 that can cause the client device 210 to present a user interface (UI) that permits or otherwise facilitates the utilization of the safety functionality in accordance with the disclosure. For instance, the user-device interaction component 410 can cause a display device of the display unit 312 to present selectable visual elements and/or non-selectable visual elements that constitute the user interface. In some embodiments, information indicative of respective formats (e.g., shape, size, font type, font size, etc.) and placements within the UI of the selectable visual elements and the non-selectable visual elements can be retained within the safety information 318 (see FIG. 3). An example of a UI 500 is shown in FIG. 5. The UI 500 includes a first selectable visual element 510 that, in response to being selected, can permit entering a username associated with a user account for a safety service that can provide the safety functionality of this disclosure. The UI 500 also includes a second selectable visual element 520 that, in response to being selected, can permit entering a password (or, in some embodiments, other types of security credentials) that can secure such an account. The UI 500 further includes a second selectable visual element 530 that, in response to being selected, can permit accessing the safety service that provides the safety functionality described herein.

Figure 6:
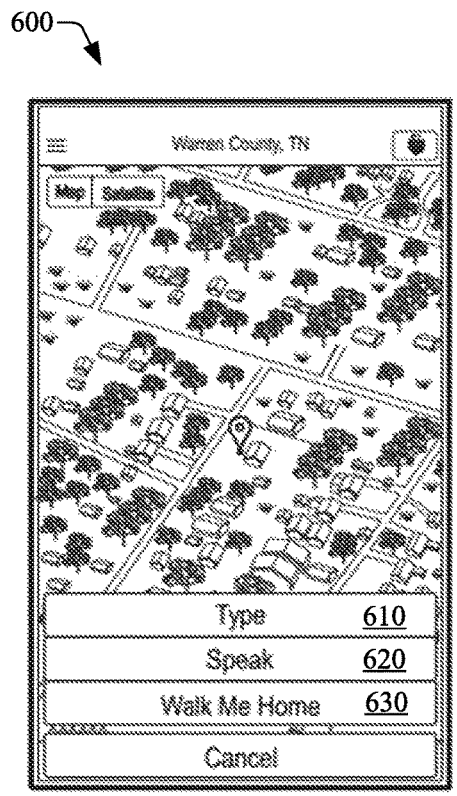
FIG. 6 presents another example of user interface for emergency responses in accordance with one or more embodiments of the disclosure.

In some embodiments, in response to (e.g., after or upon) an account associated with the safety service of this disclosure being accessed, the user-device interaction component 410 can cause the client device 210 illustrated in FIG. 3 to present a UI that can permit requesting a defined type of communication with a destination device (e.g., one of answering station device(s) 260). Thus, in one embodiment, the user-device interaction component 410 can cause the display device included in the display unit 312 (see FIG. 3) to present selectable visual elements representative of respective options for communication. As an illustration, FIG. 6 presents an example of a UI 650 that includes a first selectable visual element 610 for a first type of communication; a second selectable visual element 620 for a second type of communication; and a third selectable visual element for a third type of communication.

Selection of one of the first selectable visual element 610, the second selectable visual element 620, or the third selectable visual element 630 can cause the client device 210 to generate a connection request (see, e.g., connection request 214 in FIG. 2). To that end, with further reference to FIG. 4, a request composition component 430 can generate a connection request that include location information indicative of a location of the client device 210. In one embodiment, the location information can be indicative of GPS coordinates and can be received from the safety information 318. In addition or in other embodiments, the request composition component 430 can query the location unit 314 for location information (e.g., GPS coordinates or other type of coordinates). In addition, a communication component 420 can configure (e.g., format) the connection request according to a defined protocol for communication with a remote device (e.g., a server device of the safety service platform 140). In one example, the defined protocol for communication can include one of Hyper Text Transfer Protocol Secure (HTTPS) or Session Initiation Protocol (SIP). The disclosure is not limited in that respect and other communication protocols can be contemplated. In some embodiments, the communication component 420 can direct the radio unit 320 to send the connection request to the remote device.

Figure 7:
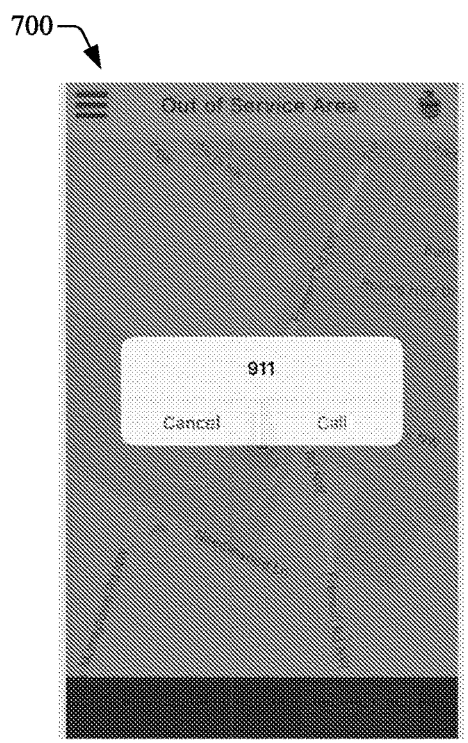
FIGS. 7-10 present examples of user interfaces for emergency responses in accordance with one or more embodiments of the disclosure.

In scenarios in which the client device 210 is located outside a coverage area, the communication component 420 can receive a denial response message indicative of denial of the connection request sent by the client device 210. The denial response message can be embodied in, for example, an HTTPS message. In one embodiment, the response message can be received by the radio unit 320 and can be sent (or otherwise made available) to the communication component 420. As discussed herein, in some embodiments, in response to the denial response message, the client device 210 can instruct the dialing of 911. To that end, the user-device interaction component 410 can cause a display device within the display unit 312 to present a visual element (selectable or otherwise) that instructs the dialing of 911. In addition or in the alternative, the user-device interaction component 410 can cause such a display device to present a selectable visual element that in response to (e.g., after or upon) being selected can cause the client device 210 to dial 911. FIG. 7 illustrates an example of a UI 700 that can be presented at the client device 210 during the establishment of the connection with an answering station device (e.g., one of answering station device(s) 260).

Figure 8:
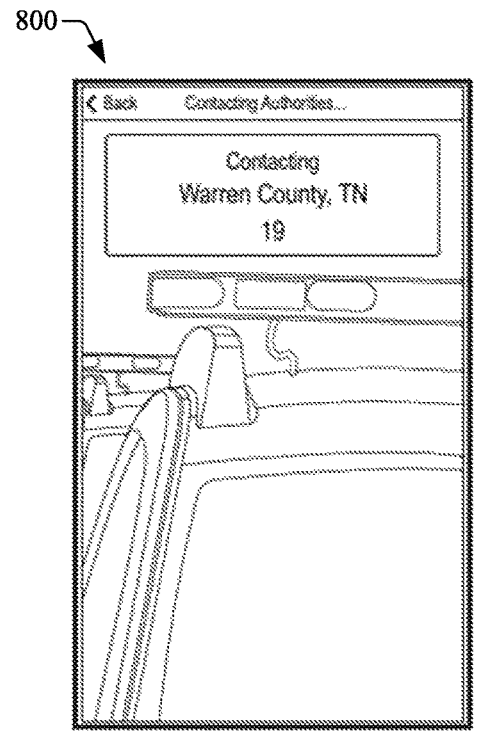

In scenarios in which the client device 210 is located inside a coverage area, the communication component 420 can receive a connect response message that includes information indicative of a communication address (e.g., an IP address) of the answering server device 250 (see FIG. 2). The connect response message can be embodied in, for example, an HTTPS message. In one embodiment, the response message can be received by the radio unit 320 and can be sent (or otherwise made available) to the communication component 420. As discussed herein, in some embodiments, in response to the connect response message, the client device 210 can connect to the answering server device 250. To that end, client device 210 can exchange, via the communication component 420 and the radio unit 320, for example, one or more messages with the answering service device 250. In addition, the user-device interaction component 410 can cause to a display device of the display unit 312 to present visual elements (selectable or otherwise) that can inform that a connection is being established. FIG. 8 illustrates an example of a UI 800 that can be presented at the client device 210 during the establishment of the connection with an answering station device (e.g., one of answering station device(s) 260).

Figure 9:
Figure 10:

After or upon a communication session has been established with an answering station device (e.g., one of the answering station device(s) 260), the user-device interaction component 410 can cause a display device of the display unit 312 of the client device 210 (see, e.g., FIG. 3) to present visual elements (selectable or otherwise) that can inform that the communication session has been established or is otherwise in progress. As mentioned, a communication session can be embodied in or can include, for example, one of a voice call, a chat session, or a videochat session. FIG. 9 illustrates an example of a UI 900 that can be presented at a client device (e.g., client device 210) upon or after a voice call has been established between a client device and an answering station device (e.g., one of answering station device(s) 260), for example. FIG. 10 illustrates an example of a UI 1000 that can be presented at the client device upon or after a chat session has been established between the client device and the answering station device, for example.

With further reference to FIG. 5, the UI 500 can include a selectable visual element 540 that, in response to selection, can cause a client device (e.g., mobile telephone 110, client device 210, or the like) to collect information to configure an account associated with an end-user associated with the client device.

In some embodiments, a unique safe keyword and/or safe key-phrase can be generated and retained in a user profile associated with a user of a client device (e.g., mobile telephone 110 or client device 210). A safe keyword can be embodied in a defined word, and a sage key-phrase can be embodied in or can include a combination of defined words that can have a defined meaning in natural language or a particular meaning to an end-user that configures the safe key-phrase. In some implementations, the safe key-phrase can include a combination of words that would not typically occur in everyday speech) that activates a safety service in accordance with this disclosure.

Figure 11:
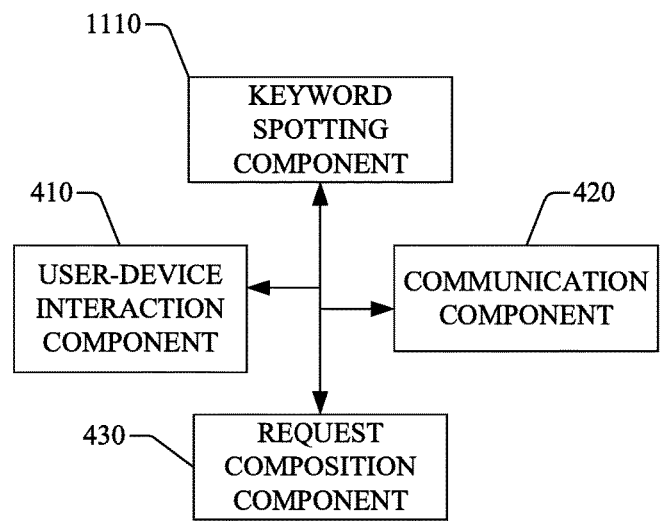
FIG. 11 presents another example of safety components for emergency responses in accordance with one or more embodiments of the disclosure.

Each one of a safe keyword or a safe key-phrase can activate safety functionality in the client device (e.g., a mobile device), the safety functionality including at least some of the functionality described herein. To that end, safety units (e.g., safety unit(s) 218) within the client device can include a keyword spotting component. As is illustrated in FIG. 11, in some embodiments, the safety component(s) 316 of the client device 210 can include a keyword spotting component 1110. In response to execution of the safety component(s), the keyword spotting component 110 can detect the safe keyword or the safe key-phrase. To that end, in some aspects, external audio signals can be received from a first audio input unit (e.g., a microphone) of the audio input unit(s) 304, and the keyword spotting component 1110 can analyze the external audio signals. In one example, the keyword spotting component 1110 can apply a keyword model to the external audio signal in order to determine either the presence or absence of the safe keyword and/or the safe key-phrase. The keyword model (e.g., a hidden Markov model (HMM) and/or a Gaussian mixture model) is directed to representing one or more predetermined keywords, such as "Need safety," and providing a probability of the safe keyword and/or safe key-phrase be included in an audible signal received by one or more of the more audio input units 304.

In response to a determination that a portion of the external audio signals include the safe keyword and/or the safe key-phrase, the user-device interaction component 410 can cause the client device 210 to present the UI 600 illustrated in FIG. 6 in order to permit communicating with an answering station device in accordance with aspects of this disclosure.

In embodiments in which the I/O interface(s) 310 include a camera, in response to safe keyword or the safe key-phrase being uttered, the client device 210 (e.g., a mobile device) can turn on or otherwise energize a camera to collect images (e.g., still pictures and/or a video segment) of the environment surrounding the client device 210. Information representative of the images can be retained in the memory 315. In addition or in other embodiments, externals audio signals can be retained in the memory 315 and/or a recording device included in the client 210. The recording device can be energized in response to keyword spotting component 1110 determining that the safe keyword and/or the sage keyphrase has been uttered. In one embodiment, the mobile device can send audio signals indicative of external audio collected by the client device 210 to an answering station device (e.g., one of the answering station device(s) 260). In addition or in another embodiment, the client device 210 can send video signals representative of the images collected by the camera.

In addition to sending audio signals and/or video signals, in some embodiments, the client device 210 (e.g., a mobile device) can send location information indicative of a location of the client device 210. The location can be silently tagged and pinned. In one aspect, as discussed, the client device 210 can send information indicative of the location to an answering station device. For instance, the client device 210 can send a message including information indicative of GPS coordinates of the device to a communication address (e.g., an IP address, such as an IPv6 address) of the answering station device. The audio signals and/or the video signals can be retained in a repository included in or functionally coupled to the answering station device. In some instances, authorities may listen in and view the situation, determining whether or not help is necessary.

Figure 12:
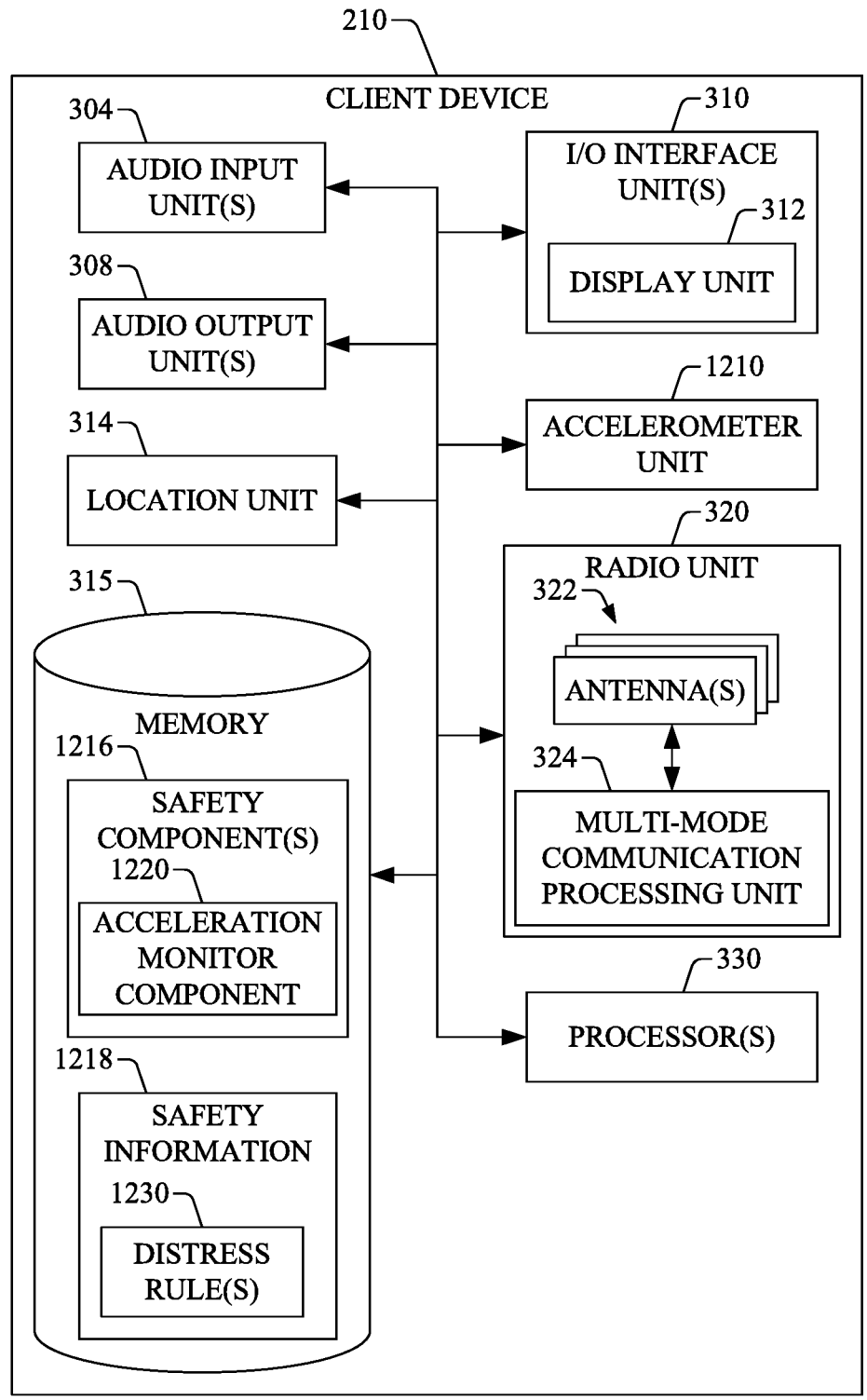
FIG. 12 presents another example of a client device for emergency responses in accordance with one or more embodiments of the disclosure.

In some embodiments, a client device 210 configured with safety components in accordance with aspects of the disclosure can respond to violent movement and/or force exerted on the client device 210, such the movement or force that the client device 210 can experience in numerous distress events, such as a car accident, physical assault, fall, and gunshot, or an attack of some kind, among other events. FIG. 12 presents an example of the client device 210 that can respond to such events in accordance with one or more embodiments of the disclosure. The client device 210 can include an accelerometer unit 1210 that can include a solid state accelerometer and circuitry that can permit or otherwise facilitate providing signals representative of acceleration (e.g., a nearly instantaneous acceleration) of the client device 210. The signals can represent an acceleration vector $a=(a_x, a_y, a_z)$ in a device frame of reference. The safety components 316 in the client device 210 can include an accelerator monitor component 1220 that can acquire (e.g., collect or receive) and can monitor a time dependency of at least a portion of the signals representative of the acceleration of the client device 210. In addition, the safety information 318 can include one or more rules 1230 that the acceleration monitor component 120 and/or another one of the safety component(s) 316 can apply to acceleration signals that are monitored.

Figure 13:
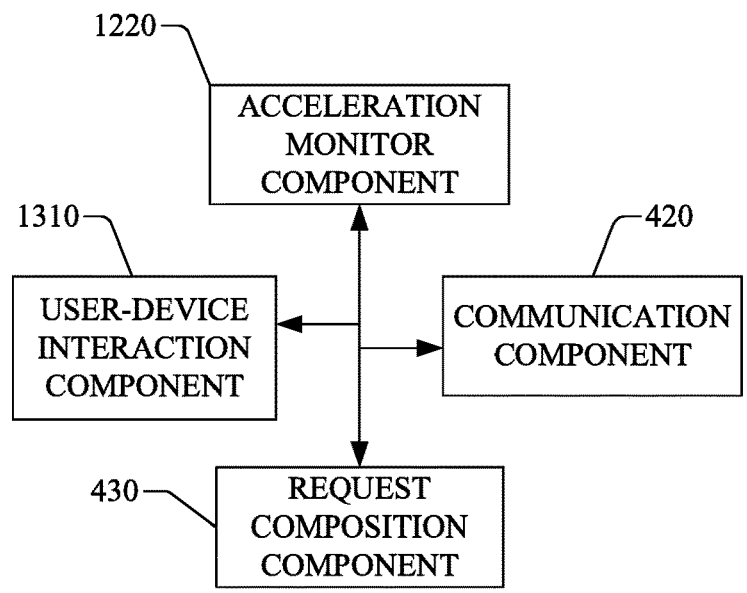
FIG. 13 presents another example of safety components for emergency responses in accordance with one or more embodiments of the disclosure.
Figure 14:
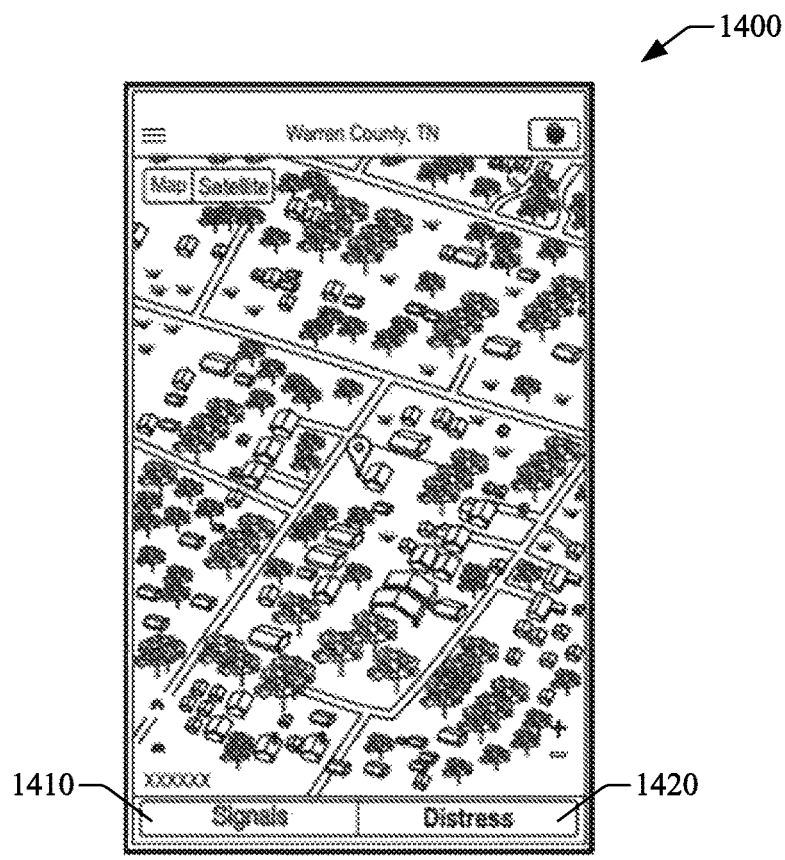
FIG. 14 presents an example of a user interface for emergency responses in accordance with one or more embodiments of the disclosure.

FIG. 13 illustrates the safety component(s) 316 in which a distress event can initiate a communication between the client device 210 illustrated in FIG. 12 and an answering station device (e.g., one of the answering station devices 260). Similar to other client devices, the user-device interaction component 1310 can cause the client device 210 to present a UI that includes selectable visual elements that can permit or otherwise facilitate accessing the safety functionality in accordance with the disclosure. As an example, the user-device interaction component 1310 can cause a display device of the display unit 312 to present the UI 1400 as is illustrated in FIG. 14. The UI 1400 includes a first selectable visual element 1410 that, in response to selection thereof can cause such a display device to present another UI that is similar to (or, in some embodiments, the same as) the UI 600 shown in FIG. 6. Selection of the first selectable visual element 1410 can be achieved, for example, via a physical interaction with a portion of a touch screen corresponding to an area of the element 1410.

As is illustrated in FIG. 14, the UI 1400 also can include a second selectable visual element 1420 that, in response to selection thereof, can cause the acceleration monitor component 1220 to initiate the collection of information representative of otherwise indicative of acceleration of the client device 210 (e.g., a mobile device). Thus, in one example, the acceleration monitor component 1220 can turn on or otherwise energize an accelerometer device or accelerometer circuitry associated therewith within the accelerometer unit to provide acceleration signals representative of an acceleration of the client device 210. In addition or in some embodiments, the acceleration monitor component 1220 can collect acceleration signals representative or otherwise indicative of the acceleration of computing device 210. In some embodiments, the acceleration monitor component 1220 can collect the acceleration signals at defined time intervals. For instance, the acceleration monitor component 1220 can collect the acceleration signals at a defined rate. In one aspect, the acceleration monitor component 1220 can query the accelerometer device at a defined rate and, in response, can receive signals representative of an acceleration vector $a=(a_x, a_y, a_z)$ in a device frame of reference at a defined instant. In some embodiments, the defined rate can be one of about 100 Hz or about 60 Hz.

In addition, the acceleration monitor component 120 can apply a distress rule to a portion of acceleration information retained or otherwise available within the safety information 1218. A result or an outcome of the application of the distress rule can determine if a distress event has occurred. In some embodiments, the rule can dictate the computation of a magnitude of a difference between a current acceleration vector and a gravity vector, and the comparison of the difference with a defined threshold. As such, in some scenarios, the acceleration monitor component 120 can determine that a distress event is absent using at least the portion of the acceleration information. Specifically, the application of the distress rule can result in the magnitude of such a difference being less than the threshold. In one of such scenarios, the monitoring of the acceleration information can continue. In other scenarios, the acceleration monitor component 120 can determine that a distress event has occurred using at least the portion of the acceleration information. In particular, the application of the distress rule can result in the magnitude of such a difference being greater than the defined threshold.

In response to (e.g., after or upon) to a determination that the distress event has occurred, the user-device interaction component 1310 can validate the occurrence of the distress event. To that end, the user-device interaction component 1310 can cause the client device to prompt confirmation of the distress occurrence of the distress event. In some instances, the user-device interaction component 1310 can receive input information that confirms the occurrence of the distress event. In other instances, the user-device interaction component 1310 can determine that the prompt has timed, e.g., that a response to the prompt is absent after or by the time a defined time interval has elapsed.

Upon or after the distress event is confirmed, the user-interaction component 1310 can cause the client device 210 to activate a camera and recording device, and/or to tag the location of the client device 210. In addition, a communication session between the client device 210 and an answering station device (e.g., one of the answering station device(s) 260) can be initiated in accordance with aspects of this disclosure. The communication session can permit sending audio signals and/or video signals to the answering station device, which device can be located in a dispatch center. Dispatch looks into the situation, and determines whether or not help is necessary.

Figure 15:
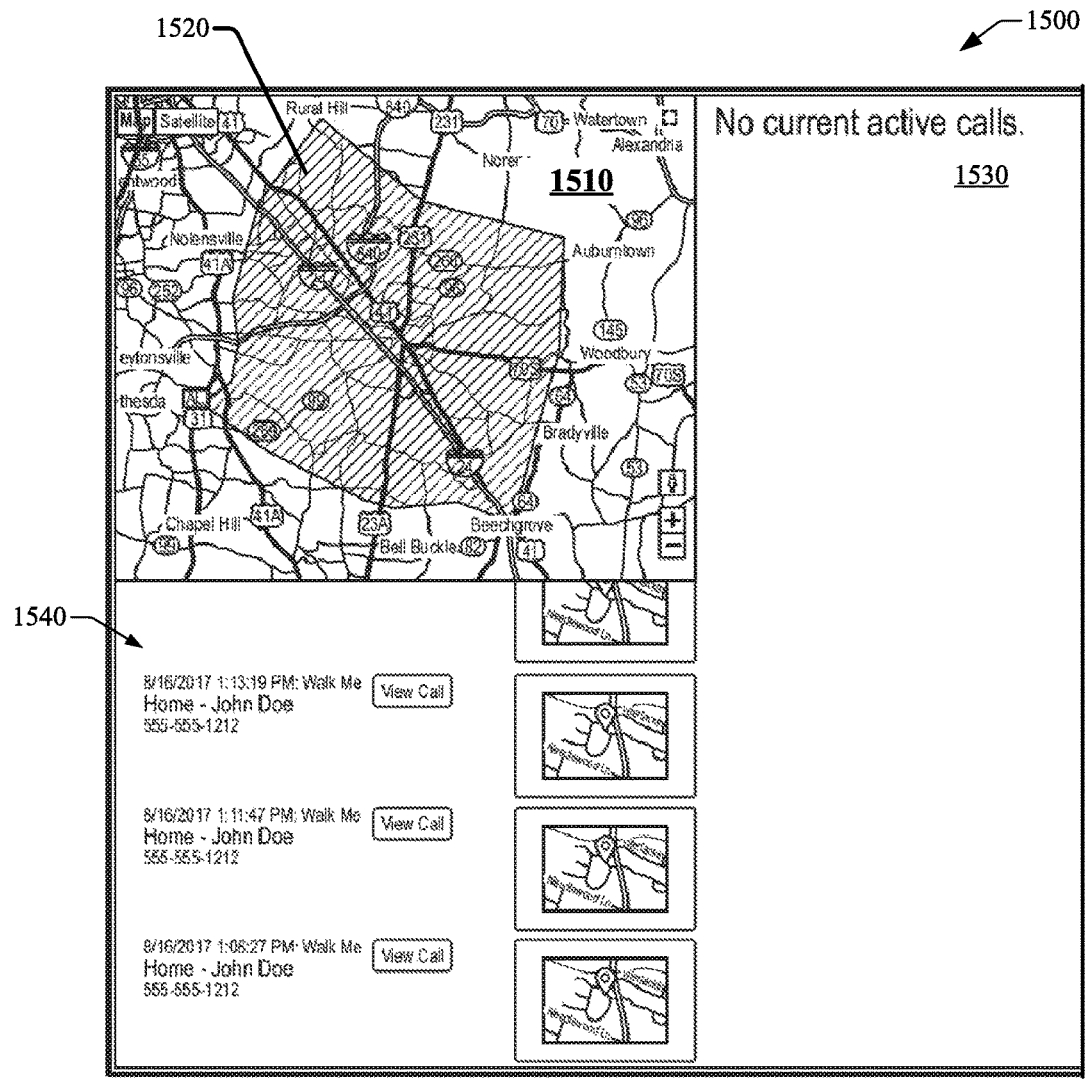
FIGS. 15-18 present other examples user interfaces for emergency responses in accordance with one or more embodiments of the disclosure.

As described herein, an answering station device (e.g., one of the answering station device(s) 260) also can include one or more safety components that can provide safety functionality in accordance with aspects of this disclosure. In some embodiments, such safety component(s) can include a user-device interaction component that can cause a display device of the answering station device to present visual elements (selectable or otherwise) that can permit or otherwise facilitate accessing at least some of the safety functionality. In some aspects, in the absence of a session communication (e.g., a voice call, a video call, or a chat session), the user-interaction component can cause the display device to present a UI 1500 as is illustrated in FIG. 15. The UI 1500 can embody or can constitute a dashboard interface that can permit or otherwise facilitate an operator of the answering station device to access some of the safety functionality. The UI 1500 can include a visual element 1510 (selectable or otherwise) that can present a map of an area that includes a coverage area 1520 associated with the answering station device. The coverage area 1520 can embody, in one example, the coverage area 120 shown in FIG. 1. The UI 1500 also includes a section 1530 that can include a visual element indicating the absence of active calls. In addition, the UI 1500 can include multiple visual elements 1540 indicative of a communication session history of the answering station device that presents the UI 1500. The multiple visual elements 1540 can include first visual elements indicative of respective time stamps (e.g., respective days and times) of communication sessions in the history. The multiple visual elements 1540 also can include second visual elements (selectable or otherwise) indicative of respective locations associated with the communication sessions in the history. Each of the second visual elements can include a portion of a map in a vicinity of a location of a client device (such as the client device 210 (e.g., a mobile telephone, a smartwatch, a tablet computer, etc.)) that originated a communication session in the history. Further, the multiple visual elements 1540 can include third selectable visual elements (represented with a box labeled "View Call") that, in response to selection, can cause the answering station device to present a record of the session content exchanged between the client device and the answering station device.

Figure 16:
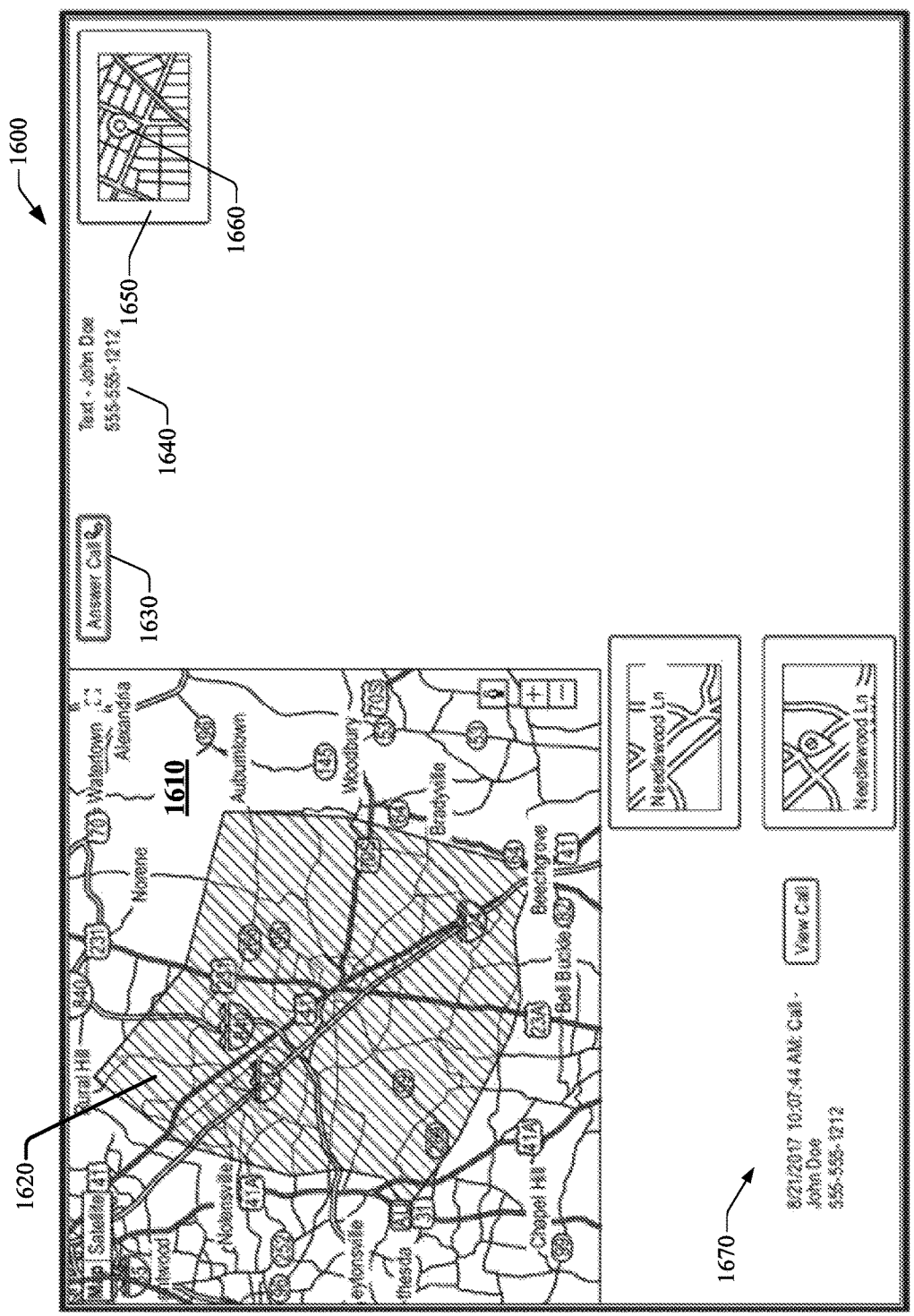

In response to (e.g., upon or after) a communication session being established between a client device and an answering station device, a user-device interaction component included in the answering station device can cause a display device of the answering station device to present a UI 1600 as is illustrated in FIG. 16. Similar to UI 1500, the UI 1600 can embody or can constitute a dashboard interface that can permit or otherwise facilitate an operator of the answering station device to access some of the safety functionality. The UI 1600 can include a visual elements 1610 (selectable or otherwise) that can present a map of an area that includes a coverage area 1620 associated with the answering station device. The coverage area 1620 can embody, in one example, the coverage area 120 shown in FIG. 1. The UI 1600 also includes a section that can include a first selectable visual element 1630 that, in response to selection, can cause the answering station device to answer a communication, thus initiating the exchange of session content between the client device and the answering station device. In addition, the UI 1600 can include a second selectable visual element that can initiate a chat session between the client device and the answering station device. The selectable visual element 1640 can include, for example, markings indicative of telephone number associated with the client device. Further, the UI 1600 can include a visual element 1650 representative of a portion of map in a vicinity of the location of client device, the portion of the map including the location of the client device. The visual element 1650 can include a visual element 1660 indicative of the location of the client device in the portion of the map. In some embodiments, at least a portion of the visual element 1650 can be selectable. In response to selection, the portion of the map can be modified to zoom in a neighboring portion of the location of the client device or to zoom out from the neighboring portion of the location of the client device.

Similar to the UI 1500, the UI 1600 can include multiple visual elements 1670 indicative of at least a portion of a communication session history of the answering station device that presents the UI 1600. The multiple visual elements 1670 can include first visual elements indicative of a time stamp (e.g., a day and time) of a communication session in the history. The multiple visual elements 1670 also can include second visual elements (selectable or otherwise) indicative of a location associated with the communication session in the history. The second visual element can include a portion of a map in a vicinity of the location of the client device (such as the client device 210 (e.g., a mobile telephone, a smartwatch, a tablet computer, etc.)) that originated the communication session in the history. Further, the multiple visual elements 1670 can include third selectable visual elements (represented with a box labeled "View Call") that, in response to selection, can cause the answering station device to present a record of the session content exchanged between the client device and the answering station device.

Figure 17:
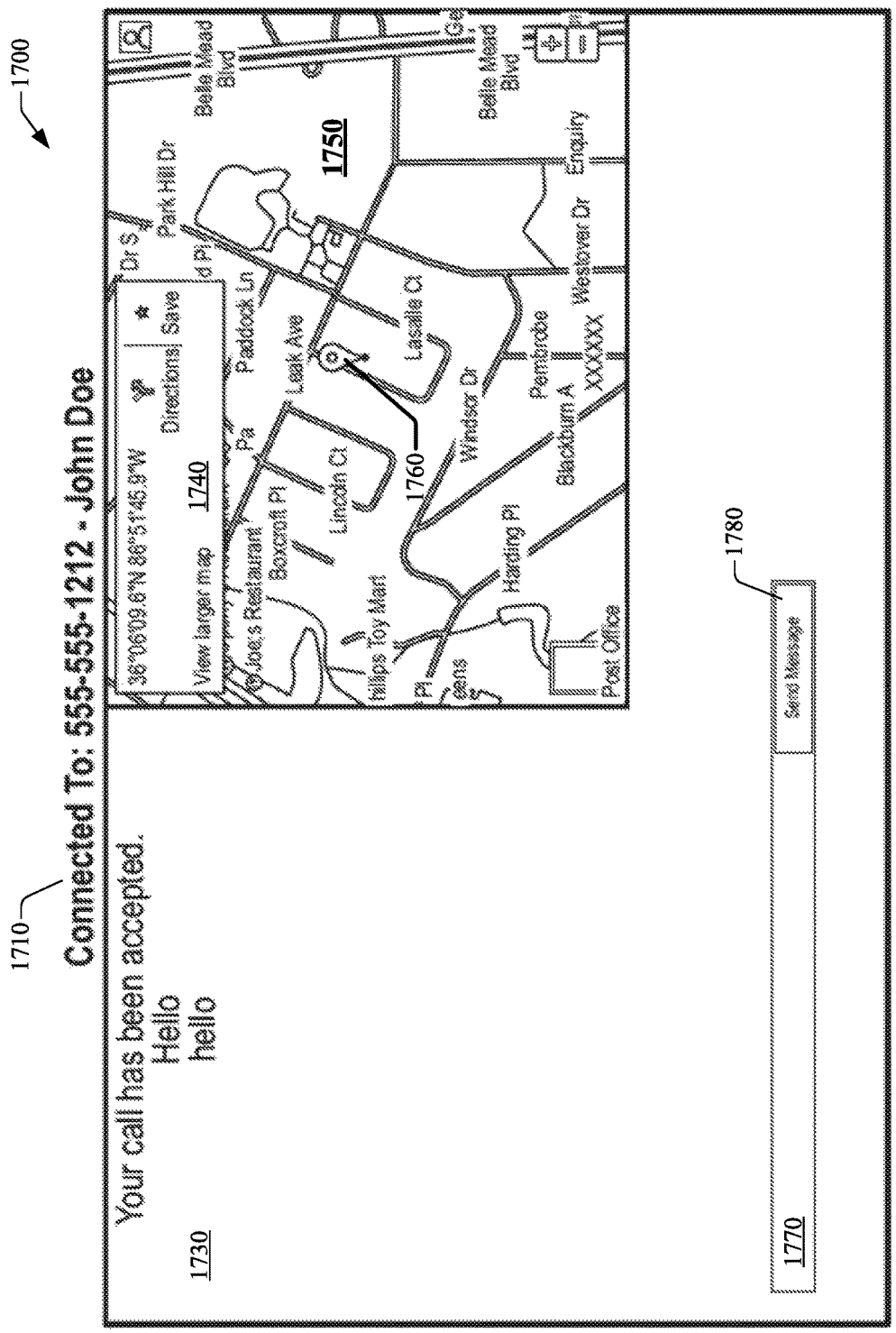

In some embodiments, in response to (e.g., upon or after) establishing a chat session between an answering station device and a client device, a user-device interaction component within the answering station device can cause a display of the answering station device to present a UI 1700 as is illustrated in FIG. 17. The UI 1700 can include a visual element 1710 indicative of a telephone number (or, in some embodiments, another type of communication address) and a name of an end-user associated with the telephone number. Similar to other UIs presented by an answering station device in accordance with aspect of this disclosure, the UI 1700 can include a section 1750 including visual elements representative of a map that includes the location of the client device. A visual element 1760 can represent such a location within the map. The UI 1700 also can include a second section 1740 that includes visual elements indicative of coordinates (e.g., latitude and longitude) of the location of the client device. The second section 1740 also can include selectable visual elements that, in response to selection, permit or otherwise facilitate modifying the map shown in the section 1750.

Further, as is illustrated in FIG. 17, the UI 1700 includes a section 1730 that includes visual elements indicative of the chat session between the answering station device that presents the UI 1700 and a client device. A selectable visual element 1770 can permit inputting message, including text and/or symbols, that can be sent to the client device. To that end, the UI 1700 includes a selectable element 1780 that, in response to selection, can cause the answering station device to send the message inputted in the selectable visual element 1770.

Figure 18:
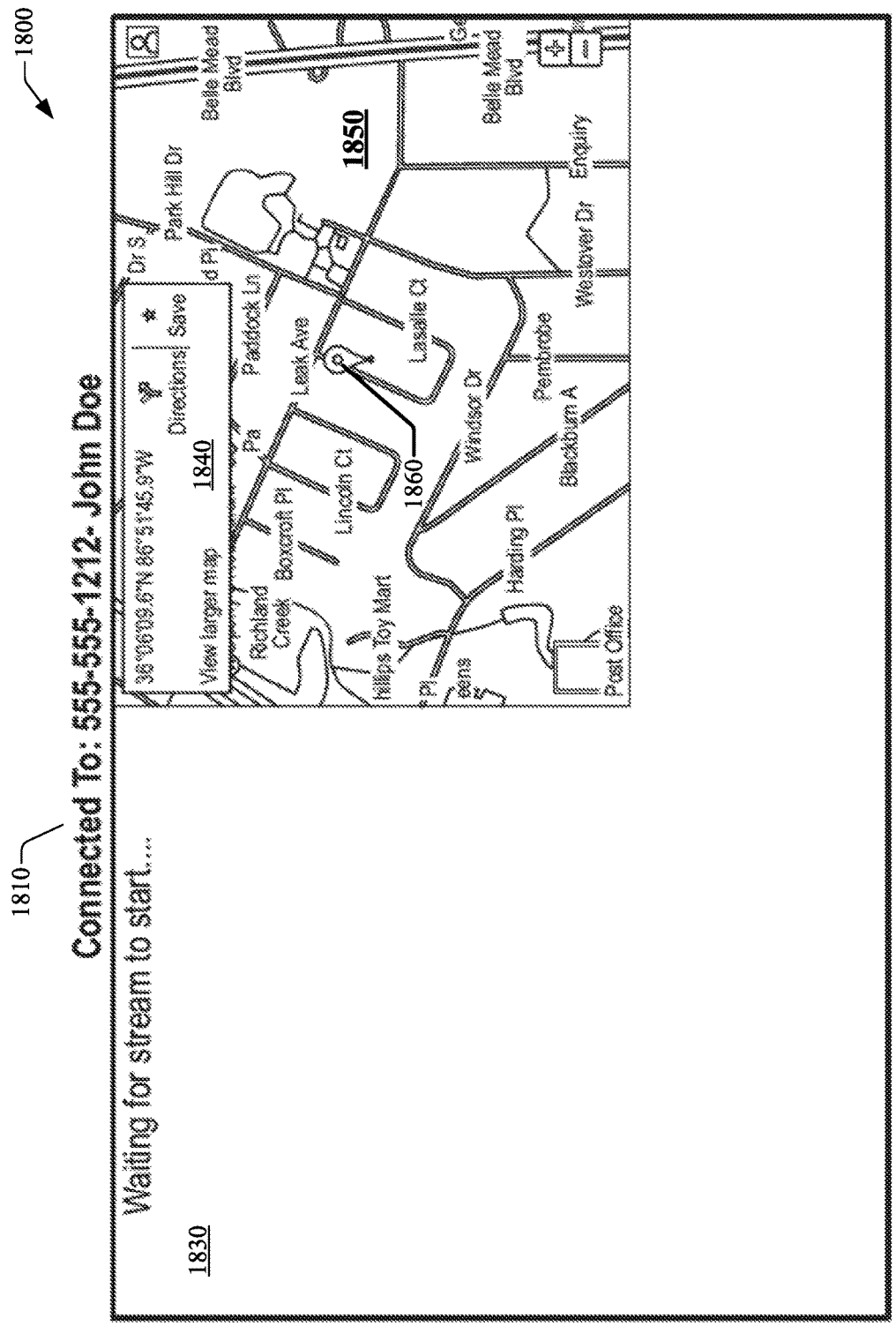

In addition or in other embodiments, in response to (e.g., upon or after) establishing a video call session between an answering station device and a client device, a user-device interaction component within the answering station device can cause a display device of the answering station device to present a UI 1800 as is illustrated in FIG. 18. The UI 1800 can include a visual element 1810 indicative of a telephone number (or, in some embodiments, another type of communication address) and a name of an end-user associated with the telephone number. Similar to other UIs presented by an answering station device in accordance with aspect of this disclosure, the UI 1800 can include a section 1850 including visual elements representative of a map that includes the location of the client device. A visual element 1860 can represent such a location within the map. The UI 1800 also can include a second section 1840 that includes visual elements indicative of coordinates (e.g., latitude and longitude) of the location of the client device. The second section 1840 also can include selectable visual elements that, in response to selection, permit or otherwise facilitate modifying the map shown in the section 1850. The UI 1800 also can include a section 1830 on which session content conveyed by video signals received from the client device can be presented.

Figure 19:
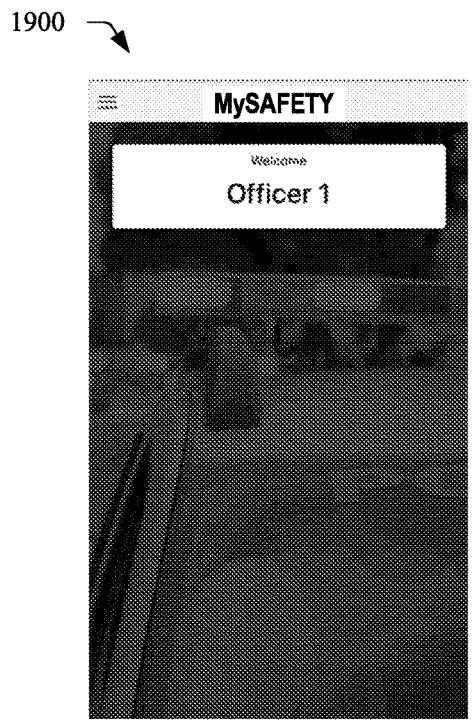
FIGS. 19-21 present yet other example of user interfaces for emergency responses in accordance with one or more embodiments of the disclosure.

As mentioned, a third-party device (e.g., a police officer device, a firefighter device, a paramedic device, and the like) also can be configured to include one or more safety components that can provide or otherwise facilitate the safety functionality of this disclosure. As an example, FIG. 19 presents a UI 1900 that can be present in a third-party device in accordance with aspects of this disclosure. In one aspect, a user-device interaction component can cause the third-party device to present the UI interface 1900 before any communication sessions have been established between the third-party device and a client device.

Figure 20:
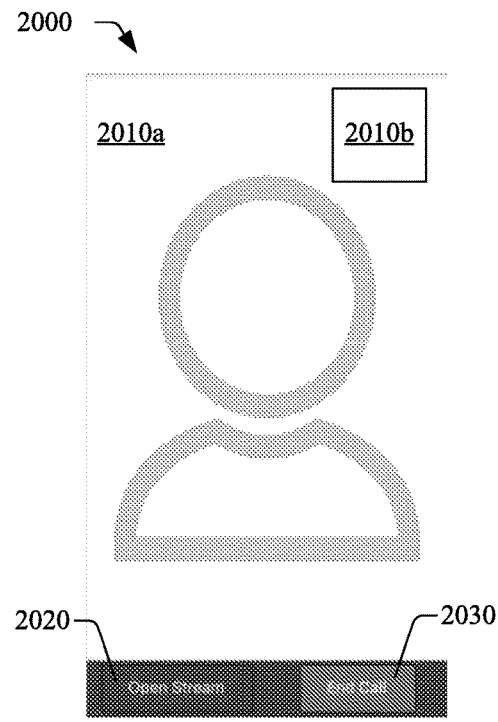

In some embodiments, a communication session can be established between a client device (e.g., client device 210) and a third-party device, via an answering server device (e.g., answering server device 250). For example, such a communication session can be established in response to selection of a selectable visual element for a video call (e.g., selectable visual element 630 can be selected). In such instances, the third party device can present a UI 2000 as is illustrated in FIG. 20. The UI 2000 can include a first section 2010a that can present a first motion picture of the surroundings of the client device and a second section 2010b of that can present a second motion picture of surroundings of the third-party device. In some embodiments, the UI 2000 can include a first selectable visual element 2020 than, in response to selection can cause the third-party device to present a video stream carrying the first motion picture. The UI 2000 also can include a second selectable visual element 2030 that, in response to selection can terminate the communication session between the client device and the third-party device. In some embodiments, the UI 2000 also can include location information (e.g., GPS coordinates) of the client device. The location information can be overlaid on a map of the surroundings of the client device in order to monitor the movement of the client device.

Figure 21:
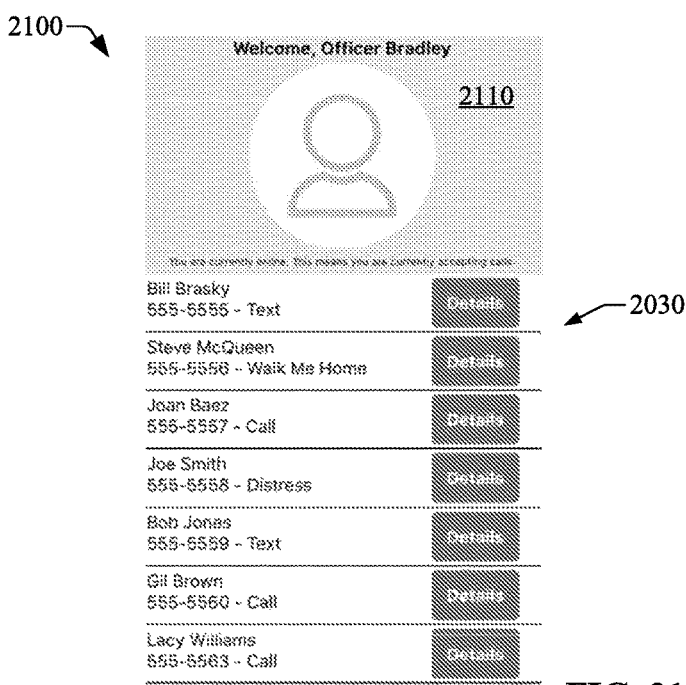

In some embodiments, a third-party device also can present a UI 2100 as is shown in FIG. 21. In some aspects, the UI 2100 can include a call history associated with an end-user of the third-party device. To that end, the end-user can login to an answering server device (e.g., answering server device 250). In some embodiments, one or more safety components retained in the answering server device can permit or otherwise facilitate the login of the third-party device. The UI 2100 can include a section 2110 including visual elements representative of information about an end-user of the third-party device. The UI 2100 also can include visual elements 2030 representative of a call history associated with the end-user. Similar to other call histories described herein, the visual elements 2030 can include first selectable visual elements that, in response to selection, can cause the third-party device to present records associated with content exchanged between a client device and the third-party device. As described herein, the end-user (e.g., a police officer) of the third-party device can log off from the answering server device in order to avoid receiving calls while off duty and out of a coverage area of a PSAP, for instance.

Figure 22:
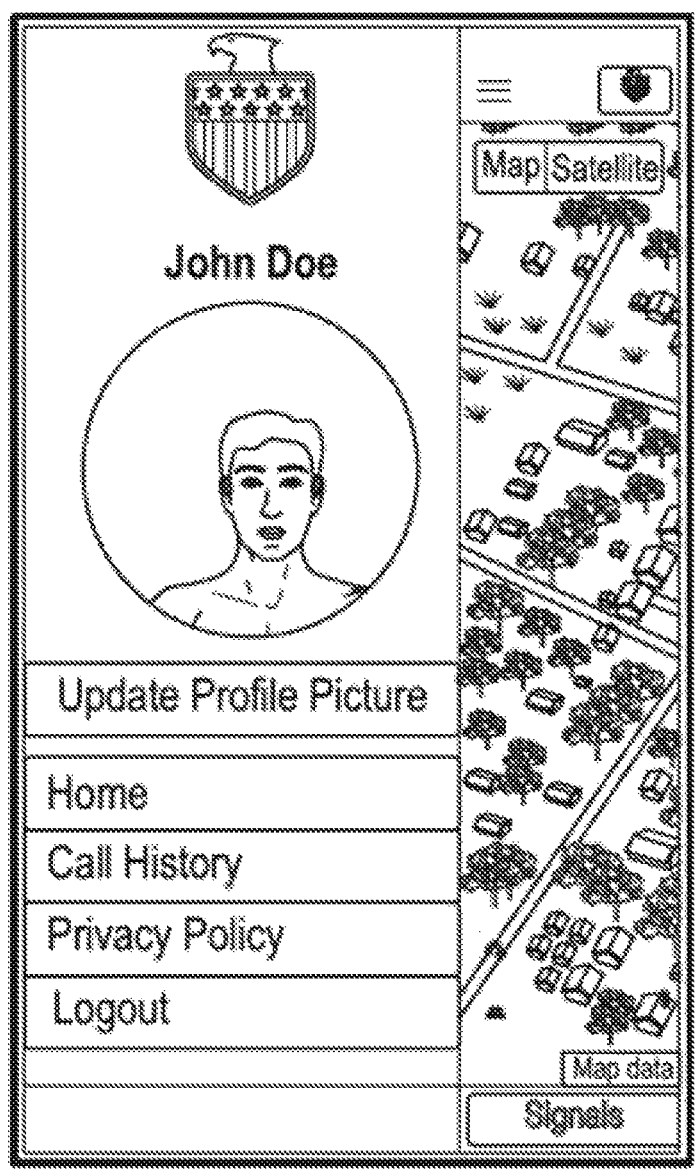
FIG. 22 presents another example of a user interface for emergency responses in accordance with one or more embodiments of the disclosure.

In some embodiments of a client device 210, the user-device interaction component 410 can cause a display device of the client device 210 to present a UI 2200 as is illustrated in FIG. 22. In some aspects, the UI 2200 can permit configuring a user profile associated with an end-user of the client device 210. As described herein, the user profile can be retained within a user repository 242 in one or more memory elements 244 (collective referred to as user profile(s) 244.

Figure 23:
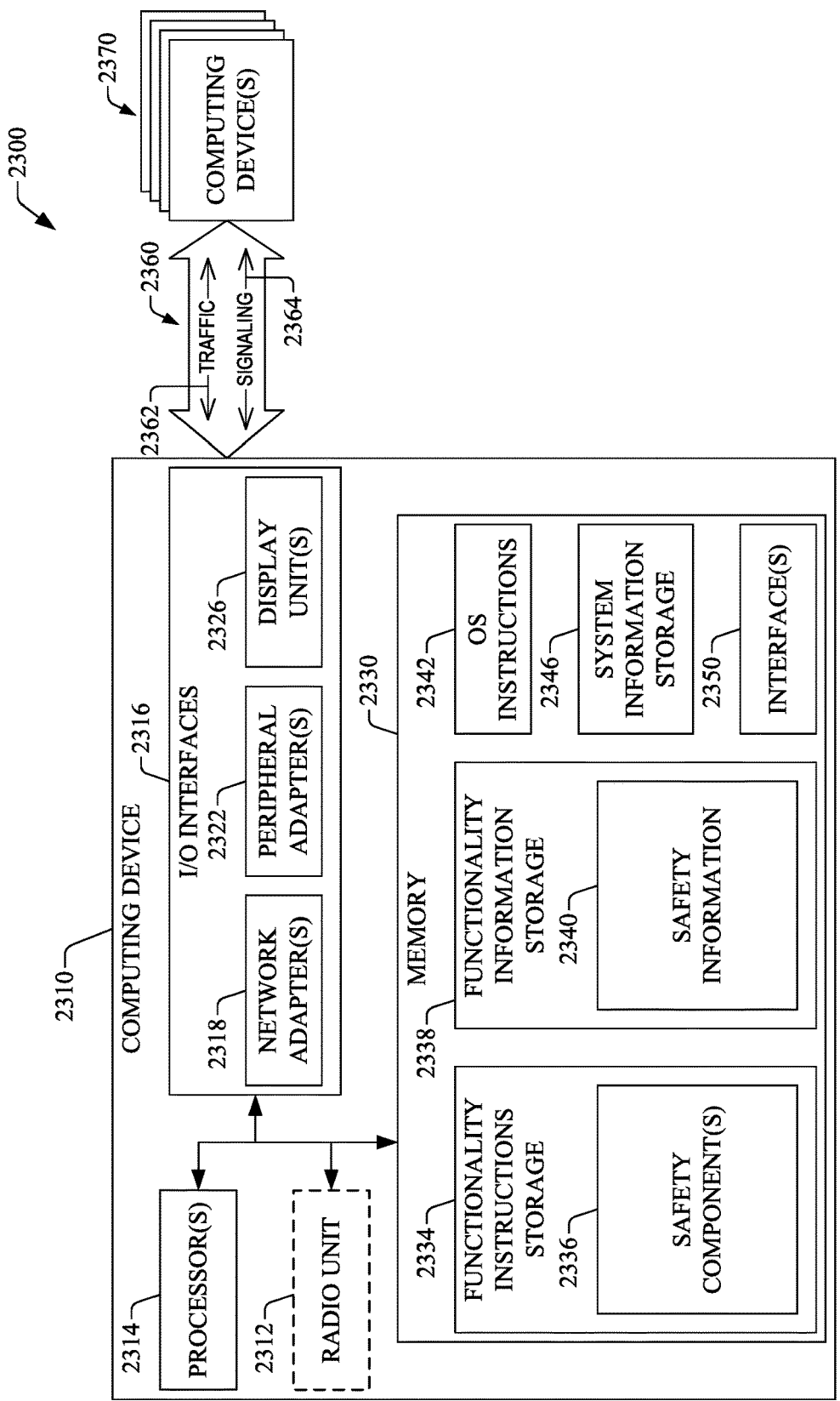
FIG. 23 presents an example computational environment for emergency responses in accordance with one or more embodiments of the disclosure.

FIG. 23 illustrates example of a computational environment 2300 for emergency responses in accordance with one or more embodiments of the disclosure. The example computational environment 2300 is merely illustrative and is not intended to suggest or otherwise convey any limitation as to the scope of use or functionality of the computational environment's architecture. In addition, the illustrative computational environment 2300 depicted in FIG. 23 should not be interpreted as having any dependency or requirement relating to any one or combination of components illustrated in the example operational environments of the disclosure. The example computational environment 2300 or portions thereof can embody or can constitute the operational environments described hereinbefore. As such, the computing device 2310 can embody or can constitute, for example, any of the communication devices or servers (such as the caller analysis server 140) described herein. In one example, the computing device 2310 can be embodied in a portable personal computer or a handheld computing device, such as a mobile tablet computer, an electronic-book reader, a mobile telephone (e.g., a smartphone), and the like. In another example, the computing device 2310 can be embodied in a wearable computing device, such as a watch, goggles or head-mounted visors, or the like. In yet another example, the computing device 2310 can be embodied in portable consumer electronics equipment, such as a camera, a portable television set, a gaming console, a navigation device, a voice-over-internet-protocol telephone, a media playback device, or the like.

The computational environment 2300 represents an example implementation of the various aspects or features of the disclosure in which the processing or execution of operations described in connection with the management of unknown callers in accordance with aspects disclosed herein can be performed in response to execution of one or more software components at the computing device 2310. It should be appreciated that the one or more software components can render the computing device 2310, or any other computing device that contains such components, a particular machine for the management of unknown callers in accordance with aspects described herein, among other functional purposes. A software component can be embodied in or can comprise one or more computer-accessible instructions, e.g., computer-readable and/or computer-executable instructions. In one scenario, at least a portion of the computer-accessible instructions can embody and/or can be executed to perform at least a part of one or more of the example methods described herein, such as the example method presented in FIG. 23. For instance, to embody one such method, at least the portion of the computer-accessible instructions can be retained (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 2310 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 2310 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with the management of unknown callers in accordance with aspects described herein can comprise personal computers; server computers; laptop devices; handheld computing devices, such as mobile tablets or e-readers; wearable computing devices; and multiprocessor systems. Additional examples can include set-top boxes, programmable consumer electronics, network personal computers (PCs), minicomputers, mainframe computers, blade computers, programmable logic controllers, distributed computing environments that comprise any of the above systems or devices, and the like.

As illustrated in FIG. 23, the computing device 2310 can comprise one or more processors 2314, one or more input/output (I/O) interfaces 2316, a memory 2330, and a bus architecture 2332 (also termed bus 2332) that functionally couples various functional elements of the computing device 2310. In certain embodiments, the computing device 2310 can include, optionally, a radio unit 2312. The radio unit 2312 can include one or more antennas and a communication processing unit that can permit wireless communication between the computing device 2310 and another device, such as one of the computing device(s) 2370. The bus 2332 can include at least one of a system bus, a memory bus, an address bus, or a message bus, and can permit the exchange of information (data, metadata, and/or signaling) between the processor(s) 2314, the I/O interface(s) 2316, and/or the memory 2330, or respective functional elements therein. In certain scenarios, the bus 2332 in conjunction with one or more internal programming interfaces 2350 (also referred to as interface(s) 2350) can permit such exchange of information. In scenarios in which the processor(s) 2314 include multiple processors, the computing device 2310 can utilize parallel computing.

The I/O interface(s) 2316 can permit communication of information between the computing device and an external device, such as another computing device, e.g., a network element or an end-user device. Such communication can include direct communication or indirect communication, such as the exchange of information between the computing device 2310 and the external device via a network or elements thereof. As illustrated, the I/O interface(s) 2316 can comprise one or more of network adapter(s) 2318, peripheral adapter(s) 2322, and display unit(s) 2326. Such adapter(s) can permit or facilitate connectivity between the external device and one or more of the processor(s) 2314 or the memory 2330. For example, the peripheral adapter(s) 2322 can include a group of ports, which can include at least one of parallel ports, serial ports, Ethernet ports, V.35 ports, or X.21 ports. In certain embodiments, the parallel ports can comprise General Purpose Interface Bus (GPM), IEEE-1284, while the serial ports can include Recommended Standard (RS)-232, V.11, Universal Serial Bus (USB), FireWire or IEEE-1394.

In one aspect, at least one of the network adapter(s) 2318 can functionally couple the computing device 2310 to one or more computing devices 2370 via one or more traffic and signaling pipes 2360 that can permit or facilitate the exchange of traffic 2362 and signaling 2364 between the computing device 2310 and the one or more computing devices 2370. Such network coupling provided at least in part by the at least one of the network adapter(s) 2318 can be implemented in a wired environment, a wireless environment, or both. The information that is communicated by the at least one of the network adapter(s) 2318 can result from the implementation of one or more operations of a method in accordance with aspects of this disclosure. Such output can be any form of visual representation, including, but not limited to, textual, graphical, animation, audio, tactile, and the like. In certain scenarios, each of the computing device(s) 2370 can have substantially the same architecture as the computing device 2310. In addition or in the alternative, the display unit(s) 2326 can include functional elements (e.g., lights, such as light-emitting diodes; a display, such as a liquid crystal display (LCD), a plasma monitor, a light-emitting diode (LED) monitor, or an electrochromic monitor; combinations thereof; or the like) that can permit control of the operation of the computing device 2310, or can permit conveying or revealing the operational conditions of the computing device 2310.

In one aspect, the bus 2332 represents one or more of several possible types of bus structures, including a memory bus or a memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and the like. The bus 2332, and all buses described herein can be implemented over a wired or wireless network connection and each of the subsystems, including the processor(s) 2314, the memory 2330 and memory elements therein, and the I/O interface(s) 2316 can be contained within one or more remote computing devices 2370 at physically separate locations, connected through buses of this form, in effect implementing a fully distributed system. In certain embodiments, such a distributed system can implement the functionality described herein in a client-host or client-server configuration in which the safety component(s) 2336 or the safety information 2340, or both, can be distributed between the computing device 2310 and at least one of the computing device(s) 2370, and the computing device 2310 and at least one of the computing device(s) 2370 can execute such components and/or leverage such information. It should be appreciated that, in an embodiment in which the computing device 2310 embodies or constitutes a client device (e.g., client device 210), the safety component(s) 2336 can be different from those in an embodiment in which the computing device 2310 embodies or constitutes a safety server device (e.g., one of safety server device(s) 240), an answering server device 250, or an answering station device 260 in accordance with aspects of this disclosure.

The computing device 2310 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 2310, and can comprise, for example, both volatile and non-volatile media, and removable and/or non-removable media. In one aspect, the memory 2330 can comprise computer-readable media in the form of volatile memory, such as random access memory (RAM), and/or non-volatile memory, such as read-only memory (ROM).

The memory 2330 can comprise functionality instructions storage 2334 and functionality information storage 2338. The functionality instructions storage 2334 can comprise computer-accessible instructions that, in response to execution (by at least one of the processor(s) 2314), can implement one or more of the functionalities of the disclosure. The computer-accessible instructions can embody or can comprise one or more software components illustrated as safety component(s) 2336. In one scenario, execution of at least one component of the safety component(s) 2336 can implement one or more of the methods described herein, such as the example methods 2400 and 2500. For instance, such execution can cause a processor (e.g., one of the processor(s) 2314) that executes the at least one component to carry out a disclosed example method. It should be appreciated that, in one aspect, a processor of the processor(s) 2314 that executes at least one of the safety component(s) 2336 can retrieve information from or retain information in one or more memory elements 2340 in the functionality information storage 2338 in order to operate in accordance with the functionality programmed or otherwise configured by the safety component(s) 2336. The one or more memory elements 2340 may be referred to as call response control information 2340. Such information can include at least one of code instructions, information structures, or the like. For instance, at least a portion of such information structures can be indicative or otherwise representative of communication addresses, caller information, response rules, and the like, in accordance with aspects described herein.

At least one of the one or more interfaces 2350 (e.g., application programming interface(s)) can permit or facilitate communication of information between two or more components within the functionality instructions storage 2334. The information that is communicated by the at least one interface can result from implementation of one or more operations in a method of the disclosure. In certain embodiments, one or more of the functionality instructions storage 2334 and the functionality information storage 2338 can be embodied in or can comprise removable/non-removable, and/or volatile/non-volatile computer storage media.

At least a portion of at least one of the safety component(s) 2336 or the safety information 2340 can program or otherwise configure one or more of the processors 2314 to operate at least in accordance with the functionality described herein. One or more of the processor(s) 2314 can execute at least one of the safety component(s) 2336 and leverage at least a portion of the information in the functionality information storage 2338 in order to provide emergency responses in accordance with one or more aspects described herein.

It should be appreciated that, in certain scenarios, the functionality instructions storage 2334 can embody or can comprise a computer-readable non-transitory storage medium having computer-accessible instructions that, in response to execution, cause at least one processor (e.g., one or more of the processor(s) 2314) to perform a group of operations comprising the operations or blocks described in connection with the disclosed methods.

In addition, the memory 2330 can comprise computer-accessible instructions and information (e.g., data, metadata, and/or programming code instructions) that permit or facilitate the operation and/or administration (e.g., upgrades, software installation, any other configuration, or the like) of the computing device 2310. Accordingly, as illustrated, the memory 2330 can comprise a memory element 2342 (labeled operating system (OS) instruction(s) 2342) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 2310 can dictate a suitable OS. The memory 2330 also comprises a system information storage 2346 having data, metadata, and/or programming code that permits or facilitates the operation and/or administration of the computing device 2310. Elements of the OS instruction(s) 2342 and the system information storage 2346 can be accessible or can be operated on by at least one of the processor(s) 2314.

It should be recognized that while the functionality instructions storage 2334 and other executable program components, such as the OS instruction(s) 2342, are illustrated herein as discrete blocks, such software components can reside at various times in different memory components of the computing device 2310, and can be executed by at least one of the processor(s) 2314. In certain scenarios, an implementation of the safety component(s) 2336 can be retained on or transmitted across some form of computer-readable media.

The computing device 2310 and/or one of the computing device(s) 2370 can include a power supply (not shown), which can power up components or functional elements within such devices. The power supply can be a rechargeable power supply, e.g., a rechargeable battery, and it can include one or more transformers to achieve a power level suitable for the operation of the computing device 2310 and/or one of the computing device(s) 2370, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 2318) to connect operationally to the conventional power grid. In another aspect, the power supply can include an energy conversion component, such as a solar panel, to provide additional or alternative power resources or autonomy for the computing device 2310 and/or one of the computing device(s) 2370.

The computing device 2310 can operate in a networked environment by utilizing connections to one or more remote computing devices 2370. As an illustration, a remote computing device can be a personal computer, a portable computer, a server, a router, a network computer, a peer device or other common network node, and so on. As described herein, connections (physical and/or logical) between the computing device 2310 and a computing device of the one or more remote computing devices 2370 can be made via one or more traffic and signaling pipes 2360, which can comprise wired link(s) and/or wireless link(s) and several network elements (such as routers or switches, concentrators, servers, and the like) that form a LAN, a MAN, a WAN, and/or other networks (wireless or wired) having different footprints. Such networking environments are conventional and commonplace in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device (s) 2370) that are functionally coupled (e.g., communicatively linked or otherwise coupled) through a network having traffic and signaling pipes and related network elements. In a distributed computing environment, in one aspect, one or more software components (such as program modules) can be located in both a local computing device and at least one remote computing device.

Figure 24:
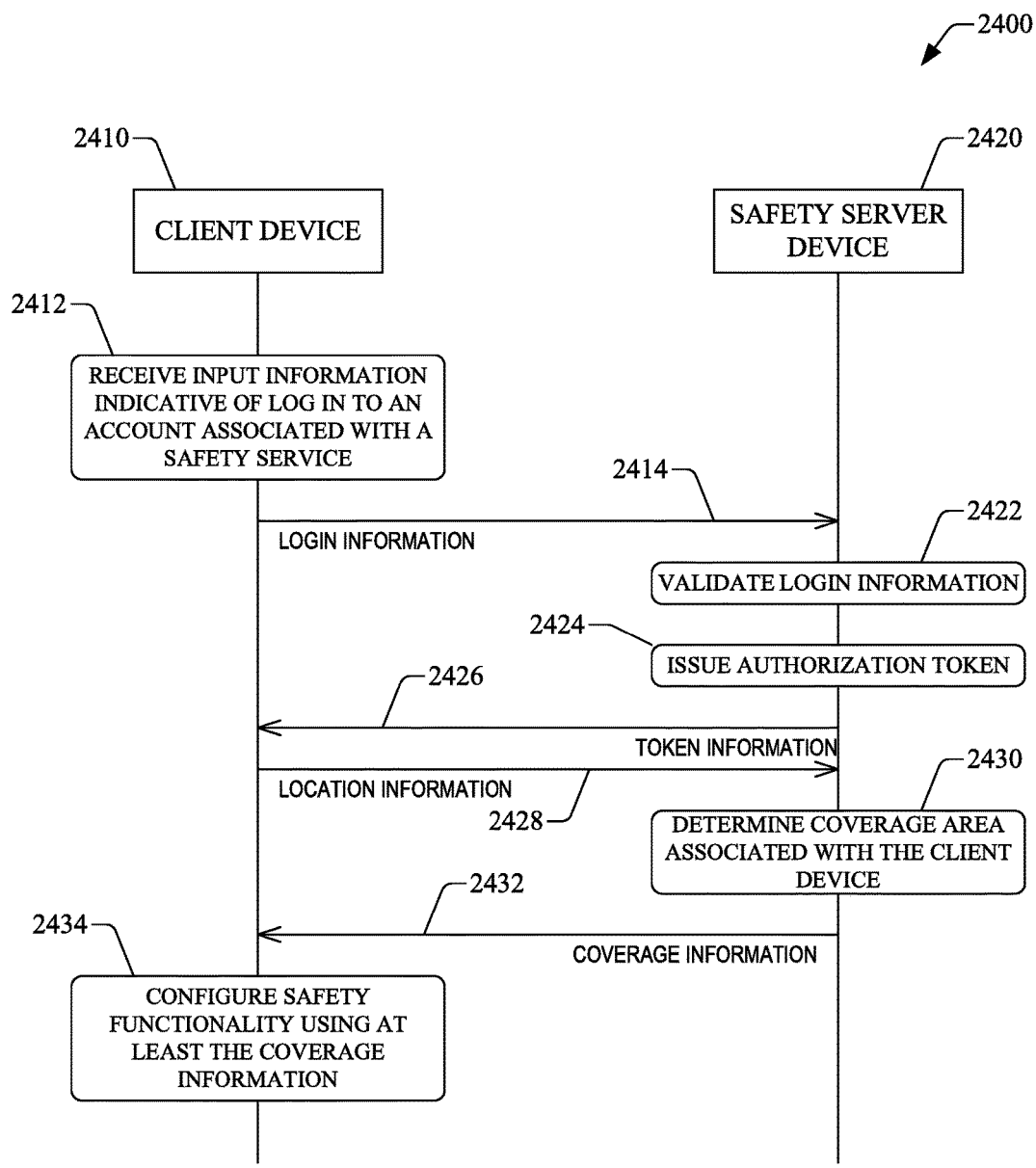
FIG. 24-25 present example methods in accordance with one or more embodiments of the disclosure.
Figure 25:
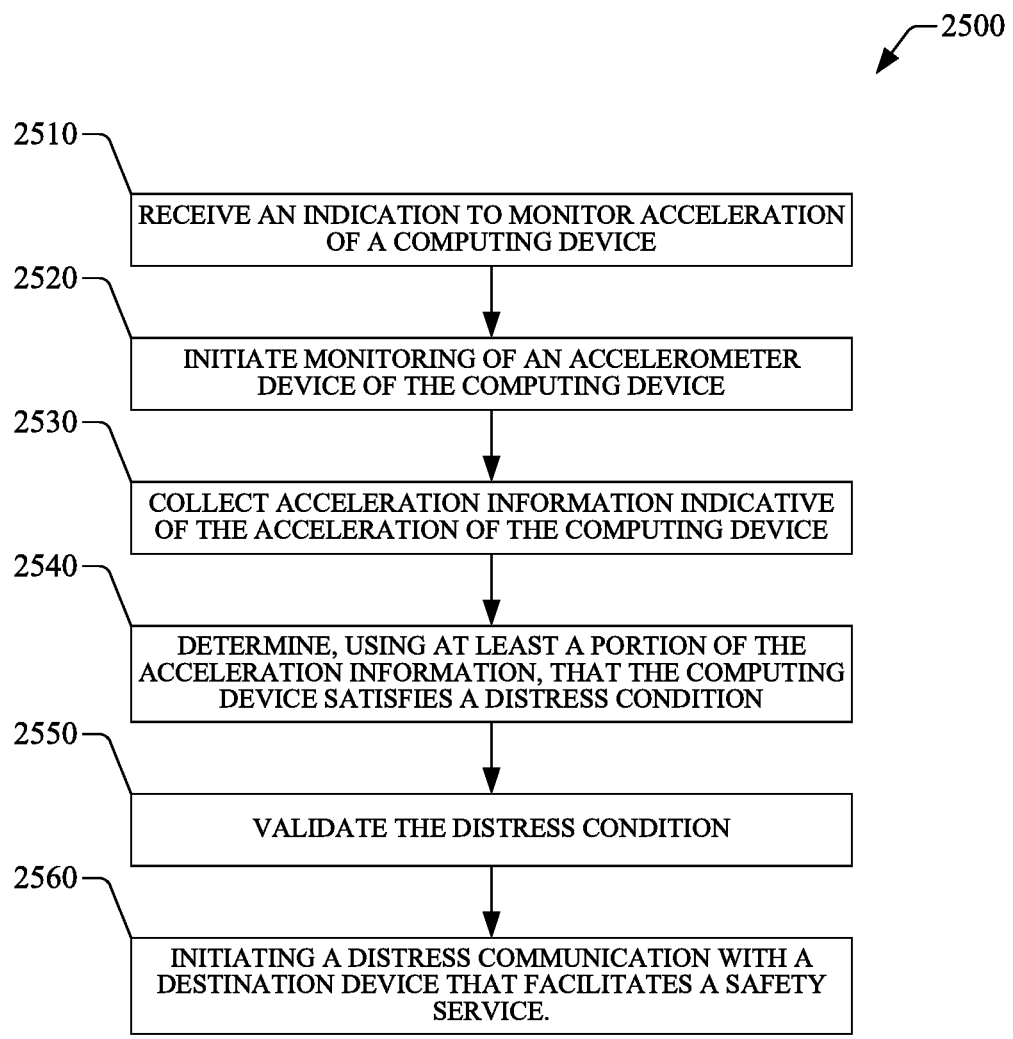

FIGS. 24-25 illustrate examples of methods for emergency responses in accordance with one or more embodiments of the disclosure. The example method 2400 includes the exchange information between a client device 2410 and a safety server device 2420. Implementation (e.g., execution) of the example method 2400 can provide integrity to a safety service. At block 2412, the client device 2410 can receive input information indicative of log in to an account associated with a safety service. At 2414, the client device can send, to the safety server device, a first message including login information. The login information can include a username and a password and/or other type of credential. The first message can be configured and transmitted according to a defined communication protocol, such as HTTPS, SIP, or the like. At block 2422 the safety server device 2420 can validate or otherwise check the login information. To that end, the safety server device 2420 can compare the login information to other information retained in a user profile associated with the user profile. At block 2424, the safety server 2420 can issue an authorization token for the client device 2410. At 2426 the safety server device 2420 can send, to the client device 2410, a second message including the token information. The first message can be configured and transmitted according to a defined communication protocol, such as HTTPS, SIP, or the like. At 2428, the client device 2410 can send, to the safety server device 2420, a third message including location information representative of a location of the client device 2410. At block 2430, the safety server device 2420 can determine a coverage area associated with the client device. To that end, the safety server device 2420 can perform a point-in-polygon calculation against a predefined group of GPS geofences, for example. A result of the calculation can determine if the client device 2410 is inside a coverage area associated with a PSAP associated with a GPS geofence or outside such a coverage area. At 2432, the safety server device 2420 can send, to the client device 2410 a fourth message including coverage information. The coverage information can convey that the client device 2410 is inside the GPS geofence or outside the GPS geofence. The client device 2410 can receive the coverage information and can configure, using at least a portion of the coverage information, safety functionality of the client device 2410. In a scenario in which the client device 2410 is inside the GPS geofence, the safety functionality can be configured to include video calls, voice calls, and/or chat sessions via an answering server device associated with a PSAP center. In a scenario in which the client device 2410 is outside the GPS geofence, the safety functionality can be limited to placing calls to 911.

A computing device can implement the example method 2500. The computing device can embody or can constitute, for example, a client device in accordance with one more embodiments of the disclosure. At block 2510, the computing device can receive an indication to monitor acceleration of the computing device. In one aspect, a display device of the computing device can receive the indication in response to the presentation of selection of a selectable visual element at the display device. At block 2520, the computing device can initiate monitoring of an accelerometer device (e.g., a solid-state accelerometer) of the computing device. At block 2530 the computing device can collect acceleration information (e.g., electric signals, such as a current signal or a voltage signal) indicative of the acceleration of the computing device. At block 2540, the computing device can determine, using at least a portion of the acceleration information, that the computing device satisfies a distress condition. At block 2550, the computing device can validate the distress condition. At block 2560, the computing device can initiate a distress communication with a destination device (e.g., an answering station device) that facilitates the safety service.

Various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., methods and systems) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit the performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read-only memory (ROM); random access memory (RAM); magnetic disk storage media; optical storage media; flash memory, etc.

Embodiments of the operational environments and methods (or techniques) are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or a method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to the arrangement of steps or operational flow; plain meaning derived from grammatical organization or punctuation; the number or type of embodiments described in the specification or annexed drawings, or the like.

As used in this application, the terms "component," "environment," "system," "architecture," "interface," "unit," "module," "pipe," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, and the electronic components can include a processor therein to execute software or firmware that provides, at least in part, the functionality of the electronic components. In certain embodiments, components can communicate via local and/or remote processes in accordance, for example, with a signal (either analog or digital) having one or more data packets (e.g., data from one component interacting with another component in a local system, distributed system, and/or across a network such as a wide area network with other systems via the signal). In other embodiments, components can communicate or otherwise be coupled via thermal, mechanical, electrical, and/or electromechanical coupling mechanisms (such as conduits, connectors, combinations thereof, or the like). An interface can include input/output (I/O) components as well as associated processors, applications, and/or other programming components. The terms "component," "environment," "system," "architecture," "interface," "unit," "module," and "pipe" can be utilized interchangeably and can be referred to collectively as functional elements.

As utilized in this disclosure, the term "processor" can refer to any computing processing unit or device comprising single-core processors; single processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance the performance of user equipment or other electronic equipment.

In addition, in the present specification and annexed drawings, terms such as "store," "storage," "data store," "data storage," "memory," "repository," and substantially any other information storage component relevant to the operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of the operational or computational environments described herein are intended to include one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques that can provide emergency responses within a defined coverage area. It is, of course, not possible to describe every conceivable combination of elements and/or methods for purposes of describing the various features of the disclosure, but it can be recognized that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A computer-readable non-transitory storage medium having instructions encoded thereon that, in response to execution, cause a computing device to perform operations comprising:
    receiving, from a user input device of the computing device, an instruction to monitor acceleration of the computing device;
    collecting acceleration information indicative of the acceleration of computing device;
    determining, using at least a portion of the acceleration information, that the computing device satisfies a distress condition; and
    sending a distress communication to a destination device that facilitates a safety service within a pre-defined coverage area,
    wherein the distress communication is sent to the destination device via a previously established connection with a server device that is functionally coupled to the destination device, the previously established connection with the server device being based on login information associated with a previously-established user account on a remote computing device, and the connection being established when the computing device is within the pre-defined coverage area.

2. The computer-readable non-transitory storage medium of claim 1, wherein determining that the computing device satisfies the distress condition comprises:
    prompting confirmation of the distress condition; and
    receiving input information indicative of the confirmation of the distress condition.

3. The computer-readable non-transitory storage medium of claim 1, wherein determining that the computing device satisfies the distress condition comprises:
    prompting confirmation of the distress condition; and
    determining that a response to the prompting is absent after a defined time interval has elapsed.

4. The computer-readable non-transitory storage medium of claim 1, wherein collecting the acceleration information indicative of the acceleration of computing device comprises querying an accelerometer device at a defined rate.

5. The computer-readable non-transitory storage medium of claim 4, wherein the defined rate is one of about 100 Hz or about 60 Hz.

6. The computer-readable non-transitory storage medium of claim 1, wherein determining, using at least a portion of the acceleration information, that the computing device satisfies a distress condition comprises determining that a magnitude of a difference between a current acceleration vector and a gravity vector is greater than a defined threshold.

7. A computing device, comprising:
    a processor circuit configured to perform operations comprising:
        receiving, from a user input device of the computing device, an instruction to monitor acceleration of the computing device;
        collecting acceleration information indicative of the acceleration of computing device;
        determining, using at least a portion of the acceleration information, that the computing device satisfies a distress condition; and
        sending a distress communication to a destination device that facilitates a safety service within a pre-defined coverage area,
        wherein the distress communication is sent to the destination device via a previously established connection with a server device that is functionally coupled to the destination device, the previously established connection with the server device being based on login information associated with a previously-established user account on a remote computing device, and the connection being established when the computing device is within the pre-defined coverage area.

8. The system of claim 7, wherein determining that the computing device satisfies the distress condition comprises:
    prompting confirmation of the distress condition; and
    receiving input information indicative of the confirmation of the distress condition.

9. The system of claim 7, wherein determining that the computing device satisfies the distress condition comprises:
    prompting confirmation of the distress condition; and determining that a response to the prompting is absent after a defined time interval has elapsed.

10. The system of claim 7, wherein collecting the acceleration information indicative of the acceleration of computing device comprises querying an accelerometer device at a defined rate.

11. The system of claim 10, wherein the defined rate is one of about 100 Hz or about 60 Hz.

12. The system of claim 7, wherein determining, using at least a portion of the acceleration information, that the computing device satisfies a distress condition comprises determining that a magnitude of a difference between a current acceleration vector and a gravity vector is greater than a defined threshold.

13. The system of claim 7, wherein sending the distress communication to a destination device includes sending one or more of contact information, location information, audio signals, and video signals to a mobile device used by an end-user who provides the safety service.

14. A processor implemented method of controlling a computing device, the method comprising:
receiving, by a processor circuit from a user input device of the computing device, an instruction to monitor acceleration of the computing device;
collecting acceleration information indicative of the acceleration of computing device;
determining, using at least a portion of the acceleration information, that the computing device satisfies a distress condition; and
sending a distress communication to a destination device that facilitates a safety service within a pre-defined coverage area,
wherein the distress communication is sent to the destination device via a previously established connection with a server device that is functionally coupled to the destination device, the previously established connection with the server device being based on login information associated with a previously-established user account on a remote computing device, and the connection being established when the computing device is within the pre-defined coverage area.

15. The method of claim 14, wherein determining that the computing device satisfies the distress condition comprises:
prompting confirmation of the distress condition; and
receiving input information indicative of the confirmation of the distress condition.

16. The method of claim 14, wherein determining that the computing device satisfies the distress condition comprises:
prompting confirmation of the distress condition; and
determining that a response to the prompting is absent after a defined time interval has elapsed.

17. The method of claim 14, wherein collecting the acceleration information indicative of the acceleration of computing device comprises querying an accelerometer device at a defined rate.

18. The method of claim 17, wherein the defined rate is one of about 100 Hz or about 60 Hz.

19. The method of claim 14, wherein determining, using at least a portion of the acceleration information, that the computing device satisfies a distress condition comprises determining that a magnitude of a difference between a current acceleration vector and a gravity vector is greater than a defined threshold.

20. The method of claim 14, further comprising:
displaying a message on an output device that instructs a user to dial 911 when the computing device is outside of the pre-defined coverage area.

21. The method of claim 14, further comprising:
capturing video data using an image sensor; and
sending the video data to the destination device.

22. The system of claim 14, wherein sending the distress communication to a destination device includes sending one or more of contact information, location information, audio signals, and video signals to a mobile device used by an end-user who provides the safety service.

* * * * *